(12) United States Patent
Kawaguchi

(10) Patent No.: US 8,635,391 B2
(45) Date of Patent: Jan. 21, 2014

(54) SYSTEMS AND METHODS FOR ELIMINATING SINGLE POINTS OF FAILURE FOR STORAGE SUBSYSTEMS

(75) Inventor: Tomohiro Kawaguchi, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 76 days.

(21) Appl. No.: 13/105,712

(22) Filed: May 11, 2011

(65) Prior Publication Data

US 2012/0290750 A1    Nov. 15, 2012

(51) Int. Cl.
*G06F 13/12* (2006.01)
*G06F 12/02* (2006.01)

(52) U.S. Cl.
USPC ............................................. 710/74; 711/162

(58) Field of Classification Search
USPC .......................................................... 710/74
See application file for complete search history.

(56) References Cited

U.S. PATENT DOCUMENTS

| | | | |
|---|---|---|---|
| 7,543,081 B2 * | 6/2009 | Dugan et al. | 710/3 |
| 2006/0130052 A1 | 6/2006 | Allen et al. | |
| 2009/0307330 A1 | 12/2009 | Allen et al. | |
| 2010/0030923 A1 * | 2/2010 | Frazier et al. | 710/11 |
| 2010/0070722 A1 * | 3/2010 | Otani et al. | 711/162 |
| 2010/0115131 A1 | 5/2010 | Eisenhauer et al. | |
| 2011/0078334 A1 * | 3/2011 | Arakawa et al. | 710/3 |
| 2011/0228670 A1 * | 9/2011 | Sasso et al. | 370/221 |

* cited by examiner

Primary Examiner — Titus Wong
(74) Attorney, Agent, or Firm — Procopio, Cory, Hargreaves & Savitch LLP

(57) ABSTRACT

Systems and methods directed to preventing a single point of failure by utilizing N_Port ID Virtualization (NPIV). During some procedures used by storage subsystems, such as migration, there is oftentimes only a single path from a host to a storage subsystem, which causes a potential single point of failure for the entire system. By utilizing NPIV, this problem may be mitigated.

8 Claims, 24 Drawing Sheets

PORT MANAGEMENT 311

311-1 (WWN LIST Table)

| PORT # | ATTRIBUTION | WWN LIST |
|---|---|---|
| 0 | TARGET | 01:23:45:67:89:00, 0A:0B:0C:0D:0E:00, 0A:0B:0C:0D:0E:01, 0A:0B:0C:0D:0E:02 |
| 1 | TARGET | 01:23:45:67:89:01, 0A:0B:0C:0D:0E:03, 0A:0B:0C:0D:0E:04, 0A:0B:0C:0D:0E:05 |
| 2 | INITIATOR | 01:23:45:67:89:02 |
| 3 | INITIATOR | 01:23:45:67:89:03 |

311-2 (Path Status Table)

| WWN | PATH STATUS |
|---|---|
| 01:23:45:67:89:00 | ACTIVE |
| 01:23:45:67:89:01 | FAULT |
| 01:23:45:67:89:02 | ACTIVE |
| 01:23:45:67:89:03 | LOGGING-IN |
| 0A:0B:0C:0D:0E:00 | LOGGING-IN |
| 0A:0B:0C:0D:0E:01 | LOGGING-IN |
| 0A:0B:0C:0D:0E:02 | LOGGING-IN |
| 0A:0B:0C:0D:0E:03 | FAULT |
| 0A:0B:0C:0D:0E:04 | FAULT |
| 0A:0B:0C:0D:0E:05 | FAULT |

FIG. 3

SYSTEMS AND METHODS FOR ELIMINATING SINGLE POINTS OF FAILURE FOR STORAGE SUBSYSTEMS

BACKGROUND

1. Field of the Invention

The present application is generally directed to storage systems having one or more storage subsystems or storage units, and more specifically, to preventing the creation of single points of failure in storage systems.

2. Description of the Related Art

In order to maintain the consistency of the data in a storage system, where an existing storage subsystem is to be replaced by a replacement storage subsystem due to failure, obsolescence or a need for maintenance, conventional storage subsystems typically require that all of the I/O to the replaced storage unit be halted. Recently, it has been possible to replace an existing storage subsystem with a replacement storage subsystem without stopping the host I/O, by using N_Port ID Virtualization (NPIV) technology. The path for the I/O connections between a host and a storage subsystem is provided through ports, each having a name or identifier.

NPIV allows for the creation of one or more virtual ports on one physical port. By this port virtualization, NPIV also allows port migrations accompanied by the device, such as host computers, storage system, to change access paths. As explained in U.S. Publication 2010/0070722, by using the multiple port environment, users can migrate data between two storage subsystems without disruption.

However, there are several unresolved issues with regard to the solution proposed by the foregoing publication. For example, for a storage system that utilizes Fiber Channel (FC), suspension of all I/O is required for several seconds in order to logout and re-login. During such a process, the path configuration of the storage subsystem reduces to a single path, which creates a single point of failure should the path be disrupted.

Therefore, there is a need to prevent such a single point of failure.

SUMMARY OF THE INVENTION

The invention is directed to methods and systems that substantially obviate one or more of the above and other problems associated with conventional techniques for storage systems, particularly the replacement of storage subsystems and prevention of possible single points of failure within those storage subsystems.

Aspects of the present invention may include a system with a host including a plurality of physical ports; a source storage system; a target storage system; and a first switch. The host accesses the source storage system via the first switch. In response to a migration request to migrate data from the source storage system to the target storage system, a first path and a second path are added between the host and the target storage system via the first switch, wherein the addition of the first path and the second path is conducted before terminating a path between the host and the source storage system.

Aspects of the present invention include a system which may include a host including a plurality of physical ports; a source storage system; a first switch and a target storage system. The host may access the source storage system via the first switch; and in response to a migration request to migrate data from the source storage system to the target storage system, the source storage system may create a virtual port to establish a first path between the host and the target storage system via the first switch; wherein the virtual port is created by N_Port ID Virtualization (NPIV).

Aspects of the present invention include a method of migrating data from a source storage system to a target storage system. The method may involve receiving a migration request from a server to migrate data from said source storage system to said target storage system; creating a first path and a second path between a host to the target storage system in response to the migration request, wherein the creating the first path and the second path is conducted before terminating a path between a host and the source storage system; and, wherein a first virtual port is created to said target storage system for creating the first path and wherein N_Port ID Virtualization (NPIV) is used to create the first virtual port.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 3 illustrates exemplary tables of aspects of the system according to an embodiment of the invention.

FIGS. 1, 9-16, 18 and 22-24 utilize differing lines to illustrate the flow of procedure, the flow of I/O and the physical path for various embodiments of the invention, as shown in the legend. Specifically, the solid lines with arrowheads indicate the flow of procedure, the dashed lines indicate the flow of I/O, and the solid bolded lines without any arrowheads indicate the physical path, respectively.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

According to the embodiments of the invention, in order to prevent a single-point-of-failure in a storage system, a storage subsystem and a host computer temporally makes another path on the physical path (first path) by using NPIV. The process requires a change in the name of ports along an existing first I/O path. According to the embodiments of the invention, each port's name is a virtual port name. The name of a port along the first I/O path to the storage subsystem that is to be replaced is changed. Based on that changed port name, the storage subsystem migrates the data and the first path to a new or replacement storage subsystem. Subsequently, the old storage subsystem and the host computer removes the second path. In this manner, it is thereby possible to keep an I/O path between the old storage subsystem and host computer after the migration is completed.

First Embodiment

In a system where the host connects to the migration source storage via one or more switches, a temporal path is added utilizing NPIV to connect the host to the migration source storage via the first switch. During the migration, when the paths connecting the host to the migration source storage are removed and connections are established at the target source storage, the temporal path maintains a redundant connection between the host and the migration source storage to ensure that there is always at least two paths between the host and the migration source storage until the migration process is completed. After the migration process is completed, the temporal path is then removed.

Figure 1:
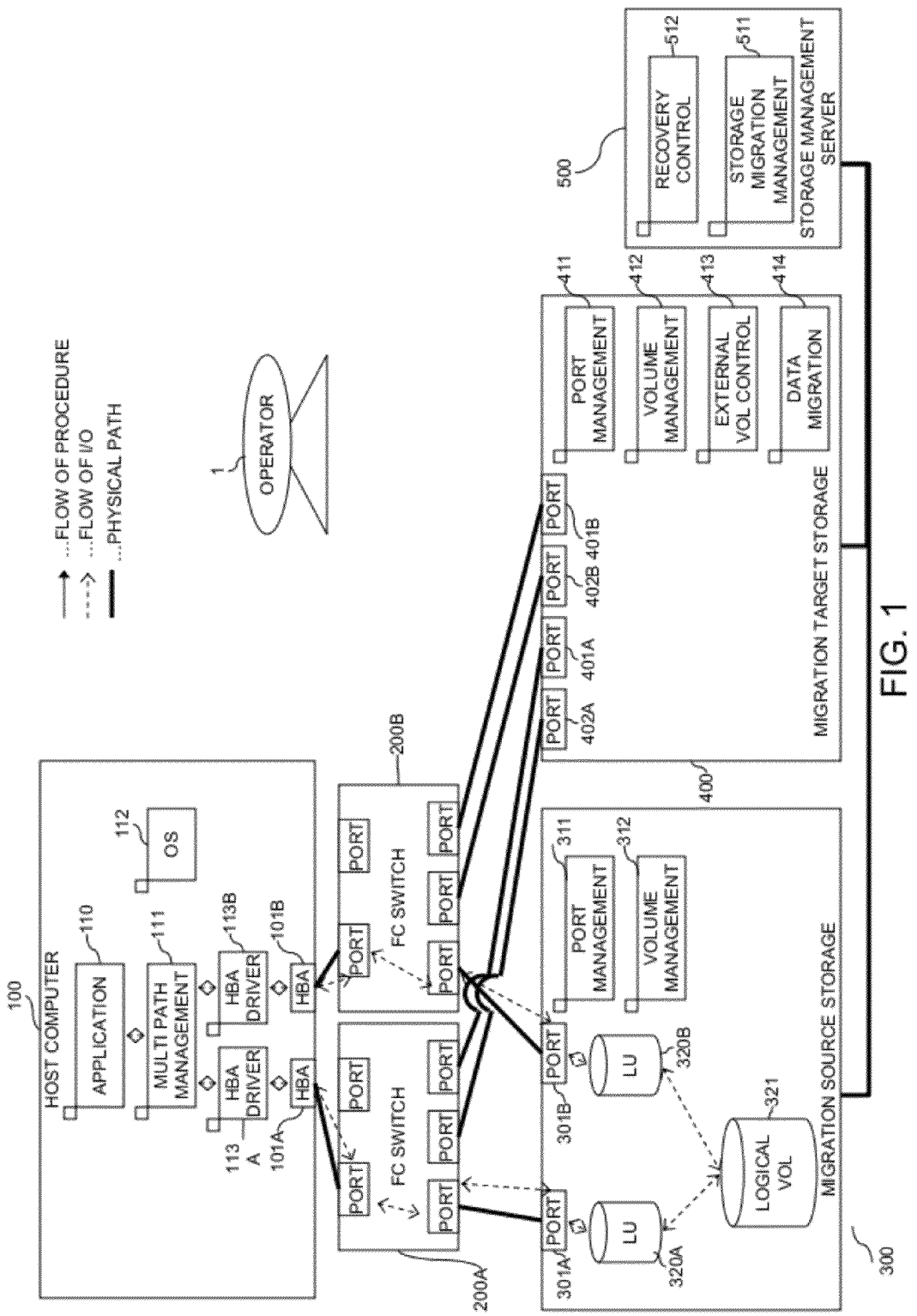
FIG. 1 illustrates one physical and logical configuration of a system according to embodiments of the invention.

FIG. 1 illustrates an example of a physical and logical configuration of the system according to an embodiment of the invention.

Operator 1: The operator may set and change configuration of host computer, switch devices and storage devices.

Host Computer 100: The host computer may include one or more Host Bus Adapters (HBA) 101, to interface to the storage. The HBA may have a port with NPIV functionality which connect to port 201 in Switch 200. Normally the Host Computer 100 has two or more HBAs 101 for redundancy, which are shown as 101a, 101b in the Figure.

Application 110: The Application 110 generates read and write I/Os. Data for the Application 110 is stored in the Migration Source Storage Subsystem 300 or the Migration Target Storage Subsystem 400.

Multi Path Management 111: The Multi Path Management 111 manages paths. For example, the Multi Path Management can create a multi path configuration for path redundancy and path performance. If a path failure occurs, the Multi Path Management blocks the failure path and transfers I/Os to another active path.

OS 112: The OS 112 manages drives (e.g. HBA Driver 113), the physical configuration of the Host computers (HBA 101) and the schedules and the resources of other jobs (e.g. Application 110 and Multi Path Management 111).

HBA Drivers 113: The HBA Driver 113 controls a physical or a virtual port. The Host computer 100 can have a plurality of HBA Drivers 113, which are shown as HBA Driver 113a, 113b, 113c.

Switches 200: The Switch 200 connects the Migration Source Storage Subsystem 300, the Migration Target Storage Subsystem 400 and the Host Computer 100. There are two or more Switches 200 for path redundancy, as shown, with respect to switch 200a and 200b. These switches support NPIV functionality.

Ports 201: The Ports 201 connects cables between HBAs 101, Ports 301 and/or Ports 401.

Migration Source Storage Subsystem 300: The Migration Source Storage Subsystem 300 is the storage subsystem that is to be removed after data migration to Migration Target Storage Subsystem 400.

Ports 301: The Ports 301 connect to Port 201 in Switch 200. The Migration Source Storage Subsystem 300 has two or more Ports for redundancy, as shown with respect to Ports 301a and 301b. Each of Ports 301 has NPIV functionality and is a target port.

LUs 320: At least one logical unit—LU 320—is allocated to one port. One port can have a plurality of LUs. In this example, there are a plurality of LUs 320, as shown in FIG. 1 with respect to LU 320*a* and 320*b*. LU 320*a* and LU 320*b* share one Logical Volume 321 for redundancy.

Logical Volume 321: The Logical Volume 321 stores data and typically comprises disk drives to make RAID groups.

Port Management 311: The Port Management manages the port configuration, port name, and path status of each port.

Volume Management 312: The Volume Management 312 manages the relationship between Ports 301, LUs 320 and Logical Volume 321.

Migration Target Storage Subsystem 400: The Migration Target Storage Subsystem 400 is operative to replace Migration Source Storage Subsystem 300.

Ports 401: Same as Ports 301

Ports 402: Same as Ports 301 except they are initiator ports.

Port Management 411: Same as Port Management 311 except the management is applied to Ports 401*a*, 402*b*, 401*a* and 401*b* instead of Ports 301*a* and 302*b*.

Volume Management 412: Same as Volume Management 312 except initially there are no LUs or logical volumes because in this case the Migration Target Storage Subsystem 400 is a new storage subsystem storing no data at first.

External Volume Management 413: The External Volume management conducts I/O transfer management and control to other storage.

Data Migration 414: The Data Migration conducts data transfer and configuration management and control migration from the other storage subsystem.

Storage Management Server 500: The Storage Management Server 500 manages the configuration of the Migration Source Storage Subsystem 300 and the Migration Target Storage Subsystem 400, and the migration between these storage subsystems. This server can be made redundant to prevent failure.

Storage Migration Management 511: The Storage Migration Management 511 manages the data/configuration migration process between the Source Storage Subsystem 300 and the Migration Target Storage Subsystem 400.

Recovery Control 512: Recovery Control 512 manages the migration process and recovers the configuration if path failure occurs.

Figure 2:
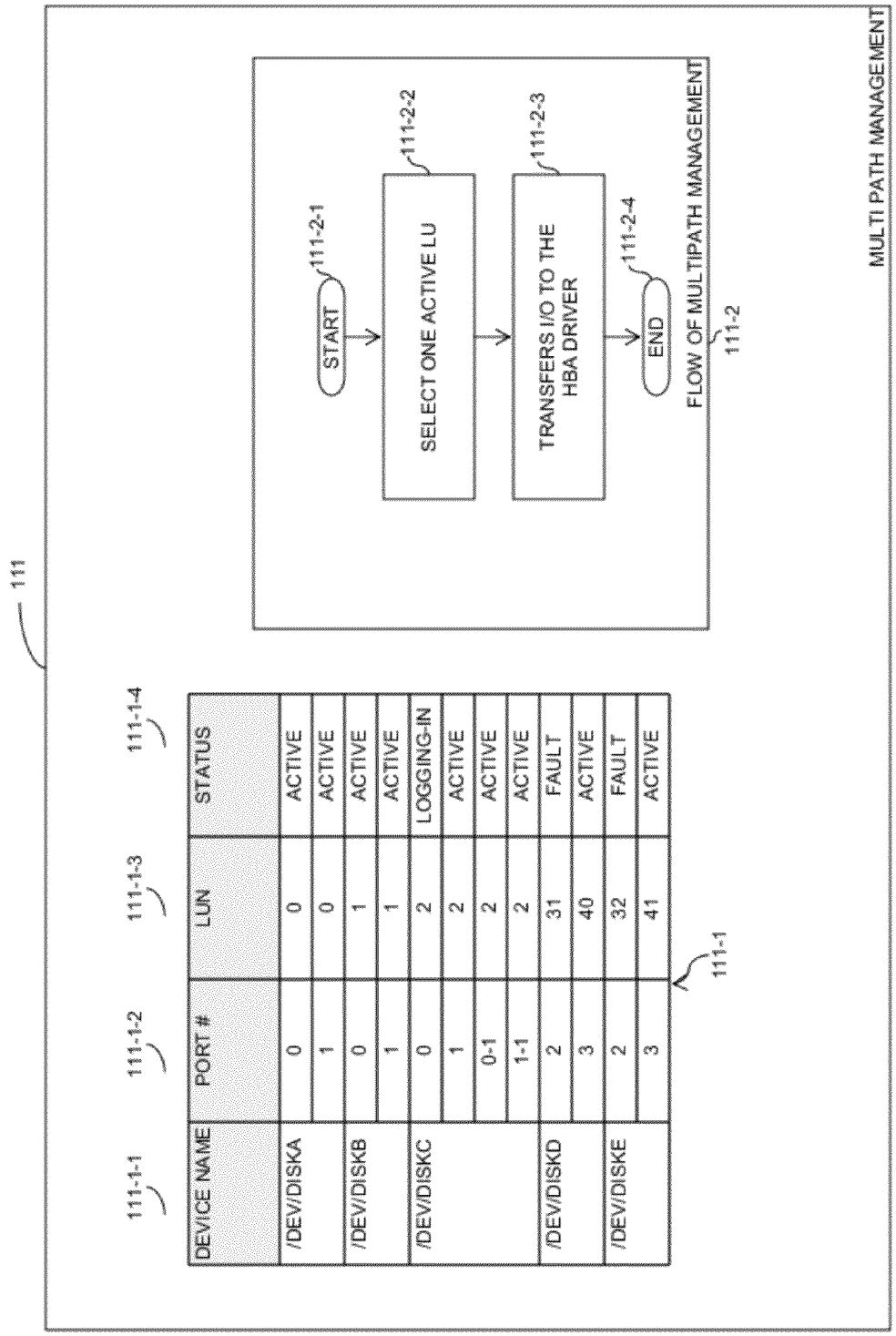
FIG. 2 illustrates an exemplary table and flowchart of aspects of the system according to an embodiment of the invention.

FIG. 2 illustrates an exemplary table and flowchart of the Multi Path Management unit 111.

Multi Path Management table 111-1: The Multi Path Management Table manages a relationship between the device file, port and LU.

Device Name 111-1: A device filename which is provided to user and applications.

Port Number 111-1-2: Indicates the Port number to which a LU is connected. One device file can utilize a plurality of LUs. Each LU is allocated on a different path.

LU Number 111-1-3: An ID of the LU in the path.

Path Status 111-1-4: Manages the status of a path that the port establishes. "Active" indicates that the path can be used. After a path failure occurs, the status of the path/port changes to "Fault". "Fault" indicates that the path cannot be used because of failure. After the failure is recovered the status changes to "Logging-in". "Logging-in" indicates that the path cannot be used temporally because the path is not established yet. After the path is established (storage port logs in), the status is changed to "Active".

Multi Path Management Program 111-2: This program selects an active path to transfer I/O.

Step 111-2-2: The Host 100 selects one active path from the Multi Path Management table 331-1 for an accessed device file. One exemplary algorithm for the selection is "Round-robin Scheduling", as is known in the art.

Step 111-2-3: The Host 100 transfers I/O to HBA Driver 101, which relates to selected ports. If the I/O has failed, then there is a change of the status in Path Status 111-1-4 to "Fault".

FIG. 3 illustrates exemplary tables for Port Management 311.

Port Name Management Table 311-1: The Port Name Management Table manages the port names of each port.

Port Number 311-1-1: An ID for the port.

Port Attribution 311-1-2: Indicates the purpose of the port. "Target" indicates that the port is used for target port. "Initiator" indicates that the port is used for initiator port.

Name List 311-1-3: A name list of a port. One port can have a plurality of names. These names are unique within the system.

Path Management Table 311-2: The Path Management Table manages the path status of each (physical and virtual) port.

Port Name 311-2-1: Indicates the name of the port. The names are listed in Name List 311-1-3

Path Status 311-2-2: Indicates the status of the path. "Active" indicates that the path can be used. After a path failure occurs, the status of the path/port changes to "Fault". "Fault" indicates that the path cannot be used because of failure. After the failure is recovered the status changes to "Logging-in". "Logging-in" indicates that the path cannot be used temporally because the path is not established yet. After the path is established (host port logs in), the status is changes to "Active".

Figure 4:
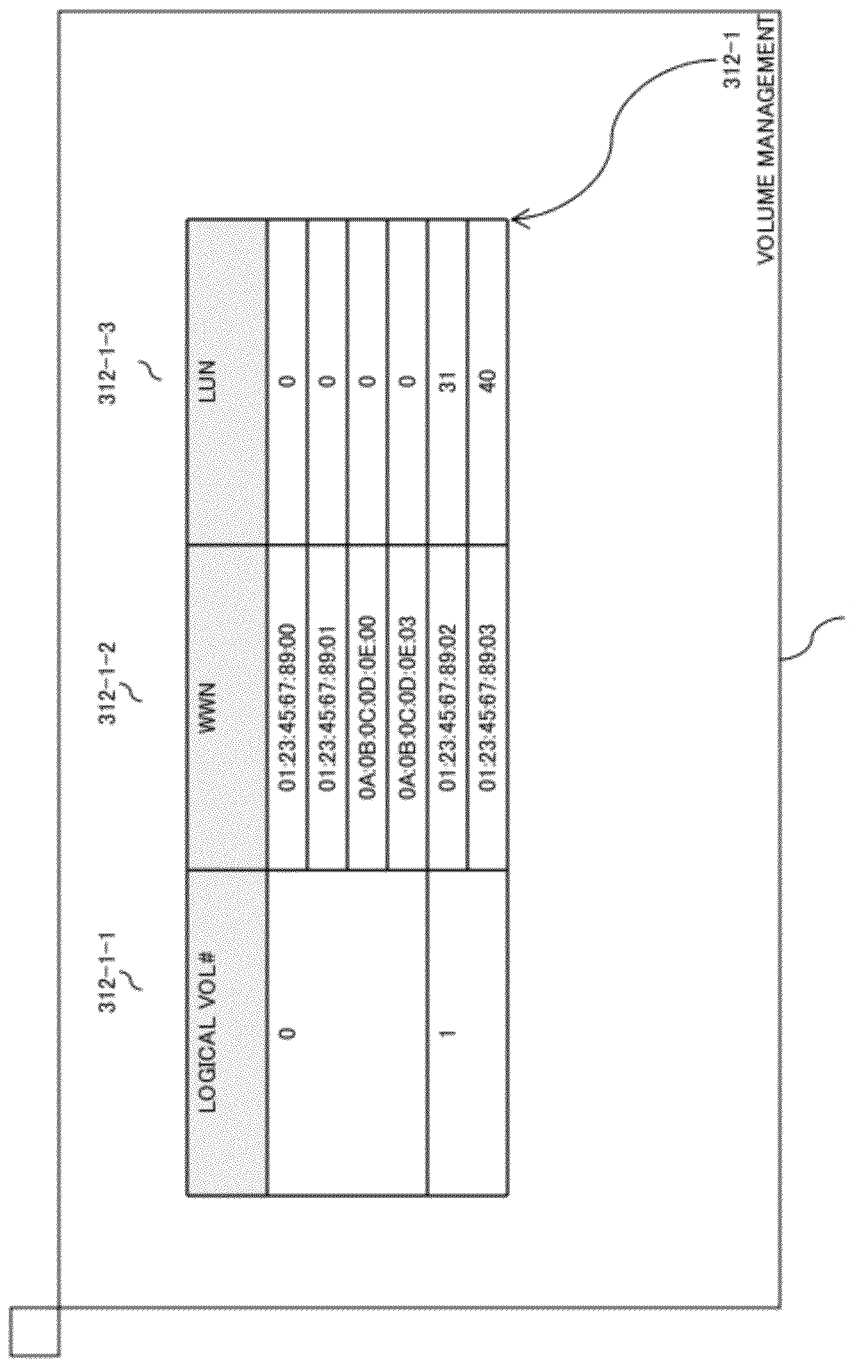
FIG. 4 illustrates an exemplary volume management table according to an embodiment of the invention.

FIG. 4 illustrates an exemplary table for Volume Management 312.

Volume Management Table 312-1 may include:

Logical Volume Number 312-1-1: An ID for a logical volume.

Port Name 312-1-2: The port name of the LU using the logical volume.

LU Number 312-1-3: The LU number of the LU using the logical volume. The number is unique in the path (same port name).

Figure 5:
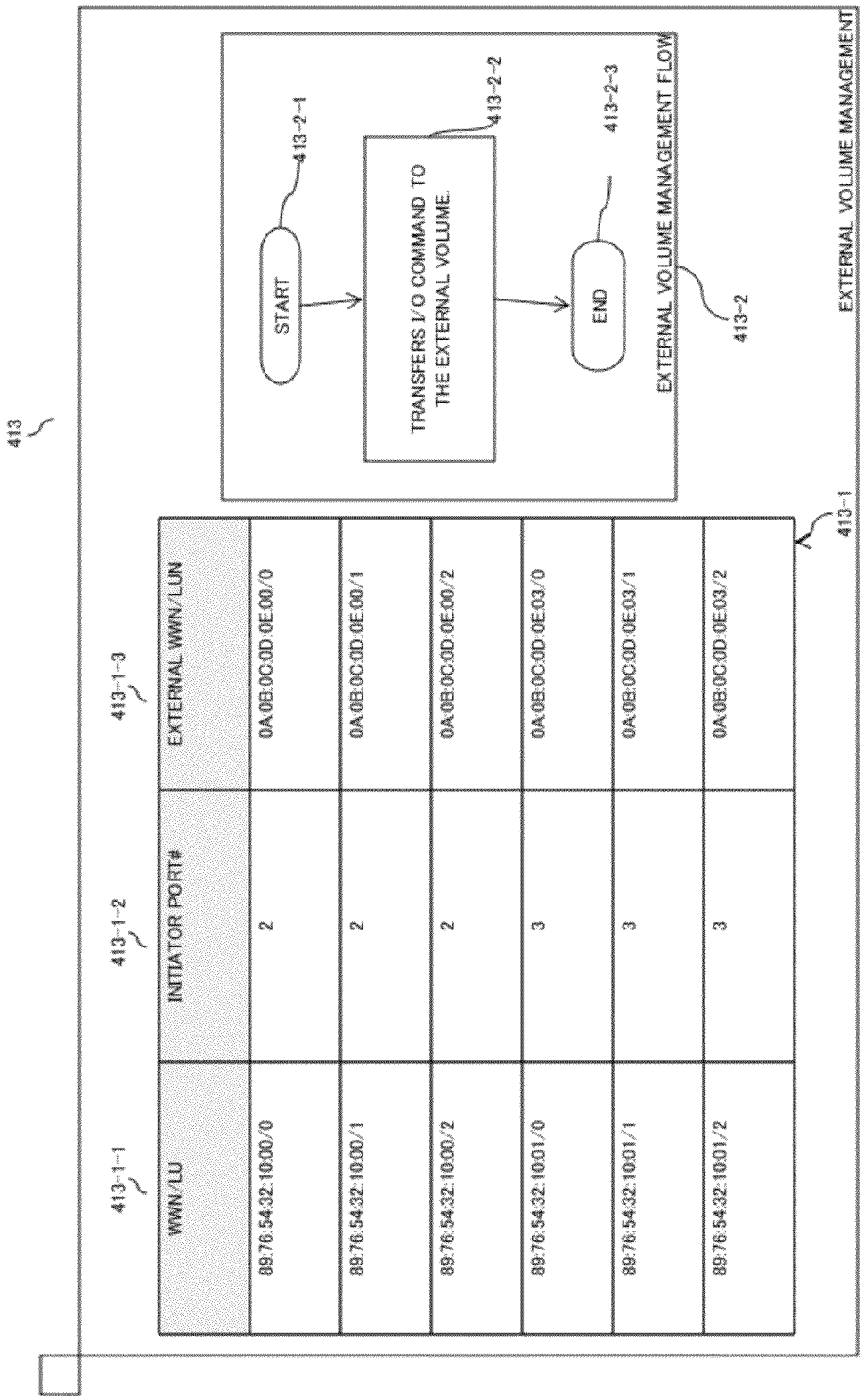
FIG. 5 illustrates an exemplary external volume management table and flowchart according to an embodiment of the invention.

FIG. 5 illustrates an example table and flowchart for External Volume Management 413.

External Volume Management Table 413-1 may include:

Target Port/LU Name 413-1-1: Indicates the target port and the name of the LU where external volume functions are being applied.

Initiator Port Number 413-1-2: An Initiator port name from which the LU transfers I/O.

External Port/LU Name 413-1-3: The target port and LU name of an external volume.

External Volume Management 413 may include an External Volume Management Program 413-2. The flow of the Management Program may include:

Step 413-2-2: When the program receives I/O, the Migration Target Storage Subsystem 400 finds the accessed LU with the Target Port/LU Name 413-1-1, selects an external volume, and transfers I/O to the external volume.

Figure 6:
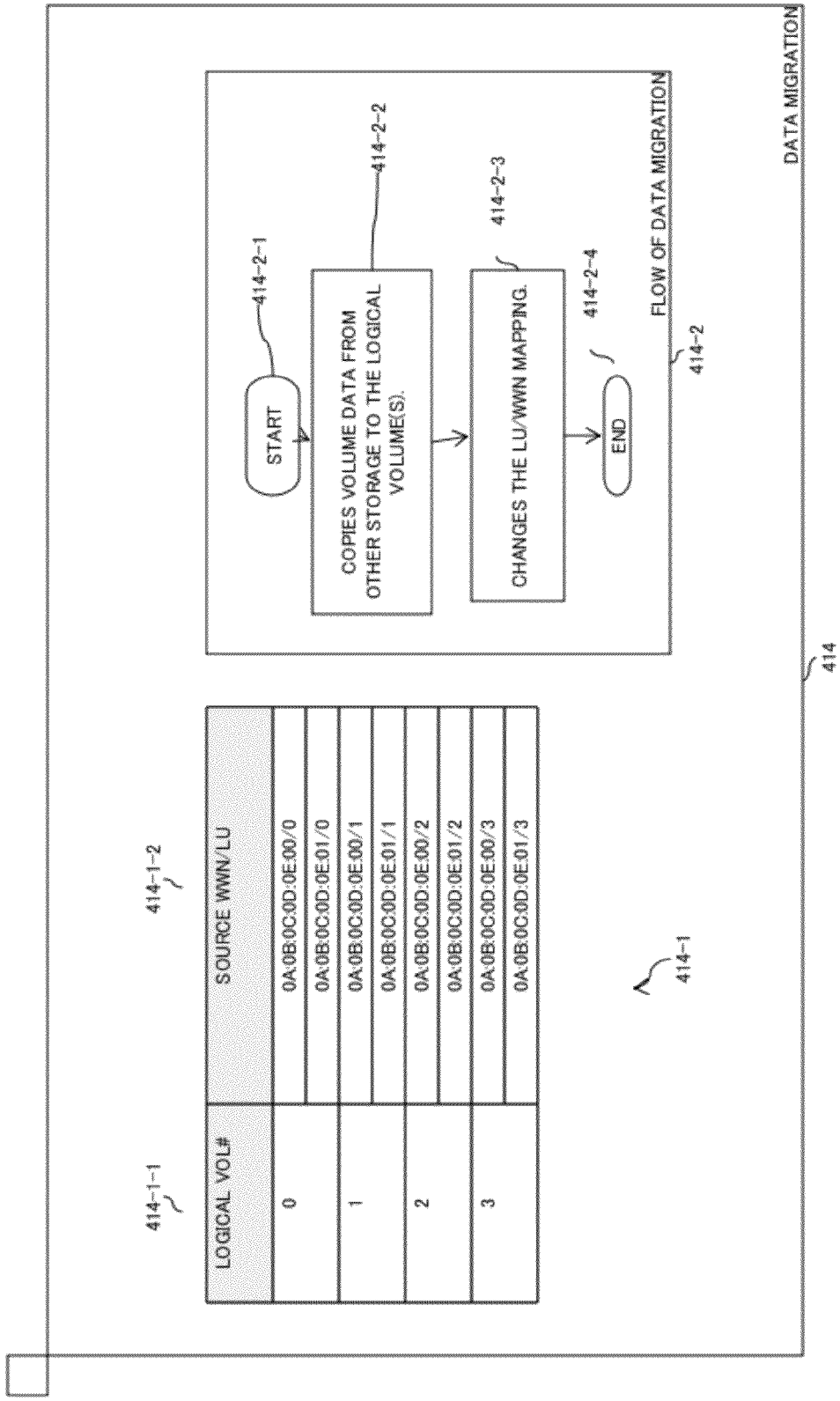
FIG. 6 illustrates an exemplary data migration table and flowchart according to an embodiment of the invention.

FIG. 6 illustrates an example table and flowchart for Data Migration 414.

Data Migration Table 414-1 may include:

Logical Volume Number 414-1-1: The ID of a logical volume where data is stored after the migration.

Migration Source Volume Number 414-1-2: The ID of the LU where data is migrated from. It can store a plurality of volume names if the path has redundancy.

The Data Migration may include a Data Migration Program 414-1-2 as shown in FIG. 6.

Step 414-2-2: the Migration Target Storage Subsystem 400 reads data from the migration source volume as described in Data Migration Table 414-1 and stores the data to designated logical volume.

Step 414-2-3: After the data copy is finished, the Migration Target Storage Subsystem 400 deletes the LU name in the External Volume Management Table 413-1 and stores the relationship between the LUs and the logical volume into the Volume Management Table 412-1.

Figure 7:
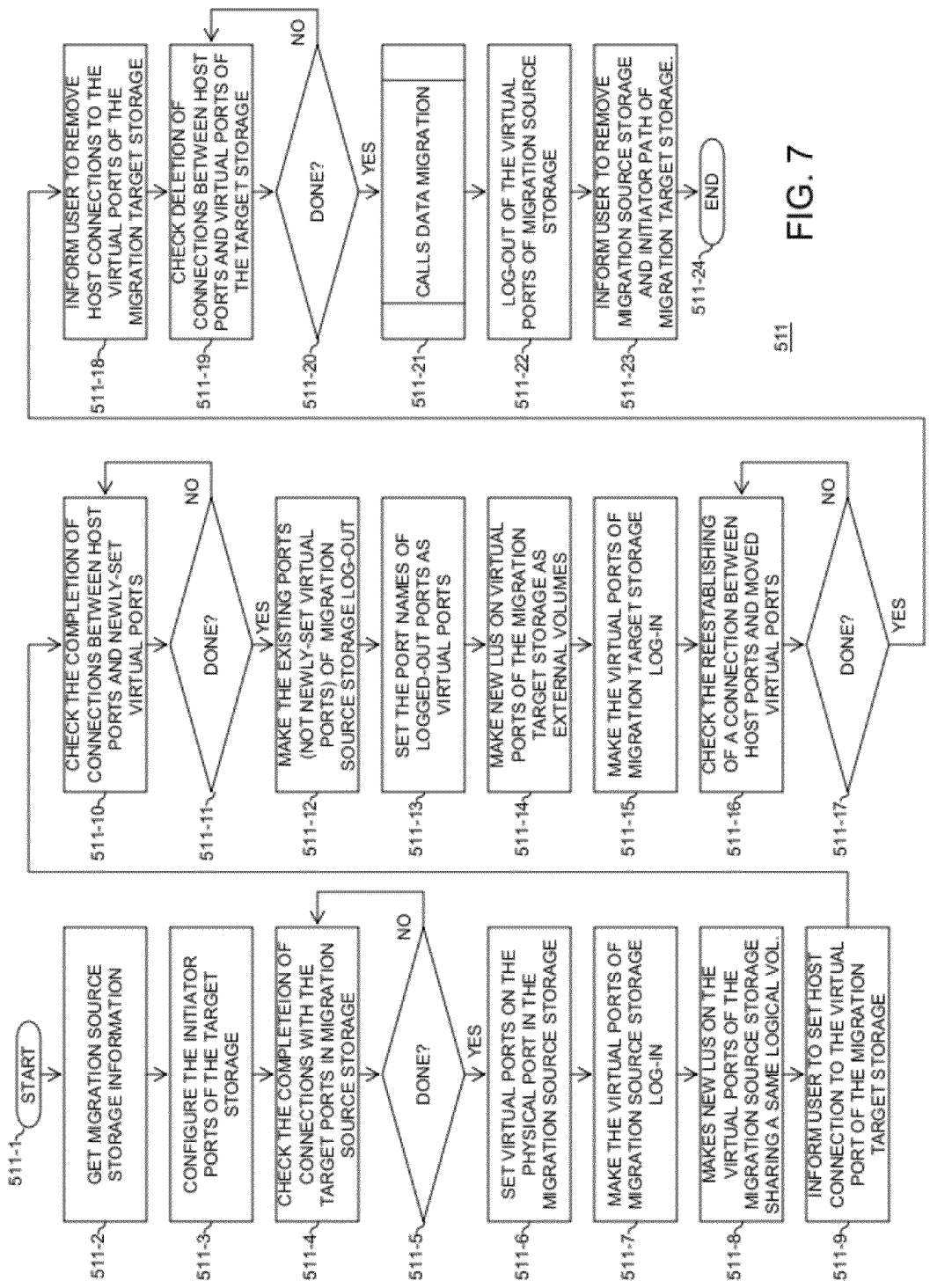
FIG. 7 illustrates an exemplary storage migration management flowchart according to an embodiment of the invention.

FIG. 7 illustrates an exemplary flowchart for Storage Migration Management 511.

Step 511-2: The storage management server gathers the configuration information from the Migration Source Storage Subsystem 300.

Step 511-3: The Storage Management Server 500 sends the path information to Port Management 411 to establish a path from Ports 402a and 402b to Ports 301a and 301b.

Step 511-4 and Step 511-5: The Storage Management Server 500 waits for the path to be established. If the path isn't established, the Storage Management Server 500 notifies the user to check the condition of the cables or the security setting.

Step 511-6: The Storage Management Server 500 orders the Port Management 311 to set new virtual target ports on Port 301a and 301b.

Step 511-7: The Storage Management Server 500 orders the new virtual target ports on Port 301a and 301b to log in the fabric.

Step 511-8: The Storage Management Server 500 orders the Volume Management 312 to provision new LUs 320c and 320d, using the new virtual target ports on Ports 301a and 301b, and sharing the same Logical Volume 321 of LU 320a and 320b.

Step 511-9: The Storage Management Server 500 informs the Operator 1 to make new connections from the Host Computer 100 to the new virtual target ports on Port 301a and 301b.

Step 511-10 and Step 511-11: The Storage Management Server 500 waits for the completion of the path establishing from Ports 101a and 101b to the new virtual target ports on 301a and 301b. During these steps, the Operator 1 sets new virtual initiator ports on Port 101a and 101b, runs HBA Drivers 113c and 113d for the new virtual initiator ports, and registers the virtual initiator port to Multi Path Management 111.

Step 511-12: The Storage Management Server 500 orders the Port Management 311 to log out the existing (not the virtual) target ports on Port 301a and 301b. Additionally, the storage management server may order the Port Management 311 to delete the name of the existing (not the virtual) target ports on Port 301a and 301b.

Step 511-13: The Storage Management Server 500 orders the Port Management 411 to name the deleted name as virtual target ports to Port 401a and 401b.

Step 511-14: The Storage Management Server 500 orders the Extended Volume Control 413 to make new LUs as external volumes mounting LU 320c and 320d.

Step 511-15: The Storage Management Server 500 orders the Port Management 411 to log in the virtual target ports on Port 401a and 401b.

Step 511-16 and Step 511-17: The Storage Management Server 500 waits for the establishment of the path. During Step 511-12 and Step 511-14, the path between Ports 101a/101b and 301a/301b is active because of the path between the respective virtual ports.

Step 511-18: The Storage Management Server 500 informs the Operator 1 to terminate the virtual initiator ports on Port 101a and 101b.

Step 511-19 and Step 511-20: The Storage Management Server 500 waits for the completion of the logging-out of the virtual initiator ports on Port 101a and 101b.

Step 511-21: The Storage Management Server 500 orders the Data Migration 414 to migrate data and configuration from Logical Volume 321 to 421.

Step 511-22: After the migration is finished, the Storage Management Server 500 deletes virtual target ports on Port 301a and 301b.

Step 511-23: The Storage Management Server 500 informs the user to remove Migration Source Storage Subsystem 300.

Figure 8:
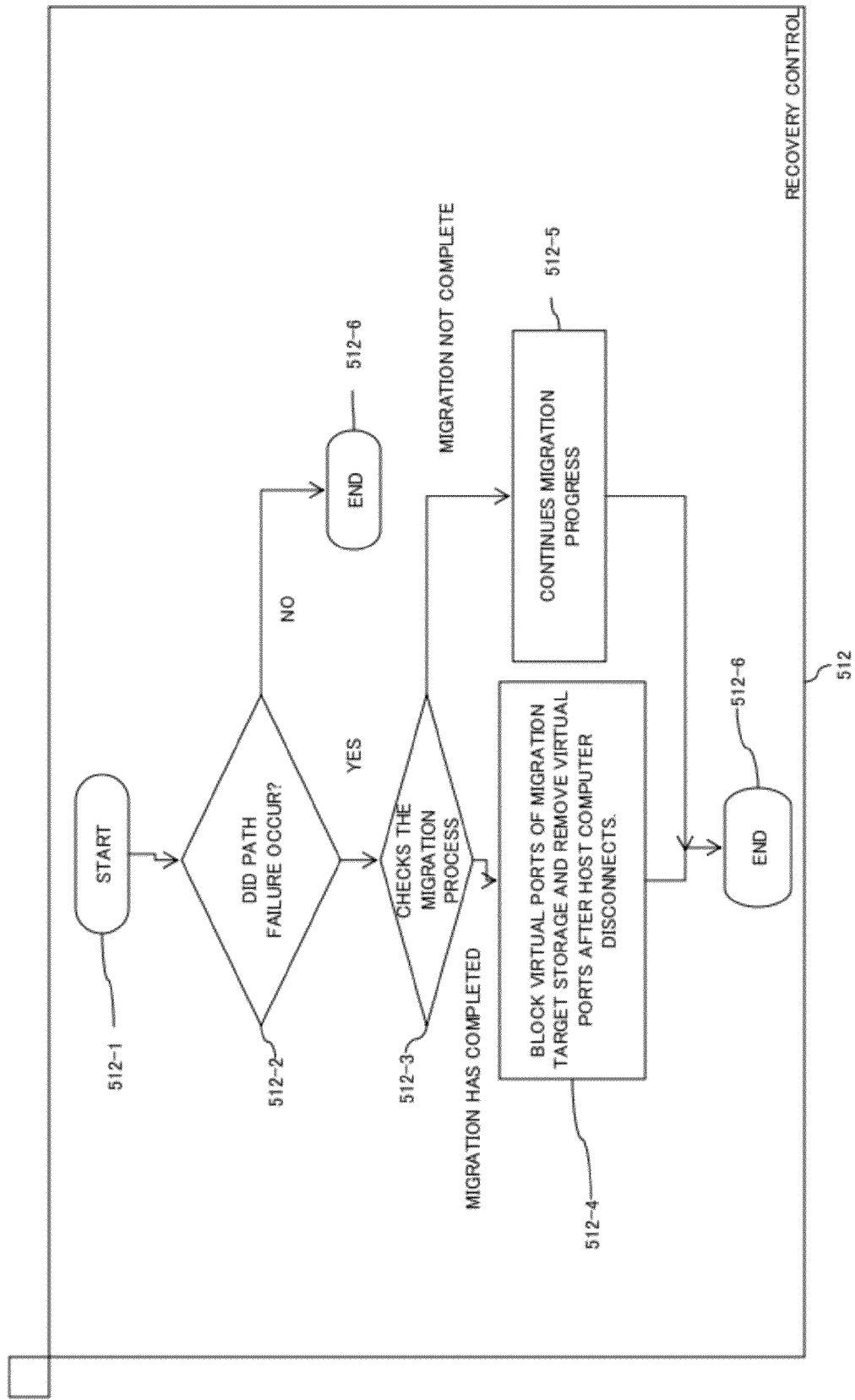
FIG. 8 illustrates an exemplary recovery control flowchart.

FIG. 8 illustrates an example flowchart for Recovery Control 512.

Step 512-2: The Storage Management Server 500 checks if a path failure has occurred. If there is no failure then the storage management server exits the recovery control process.

Step 512-3: The Storage Management Server 500 checks the progress of the migration for the failed path. If the migration has finished, proceed to Step 512-4, otherwise Step 512-5.

Step 512-4: The Migration Source Storage Subsystem 300 creates a virtual port which connects to the active path blockage. The Storage Management Server 500 informs the user to remove a virtual port on Host Computer 100 which connects to the active path. After the removal of the virtual port of the host computer, the Storage Management Server 500 order the Migration Source Storage Subsystem 300 to remove the virtual port.

Step 512-5: The Storage Management Server 500 allows the migration to continue and exit recovery control.

Figure 9:
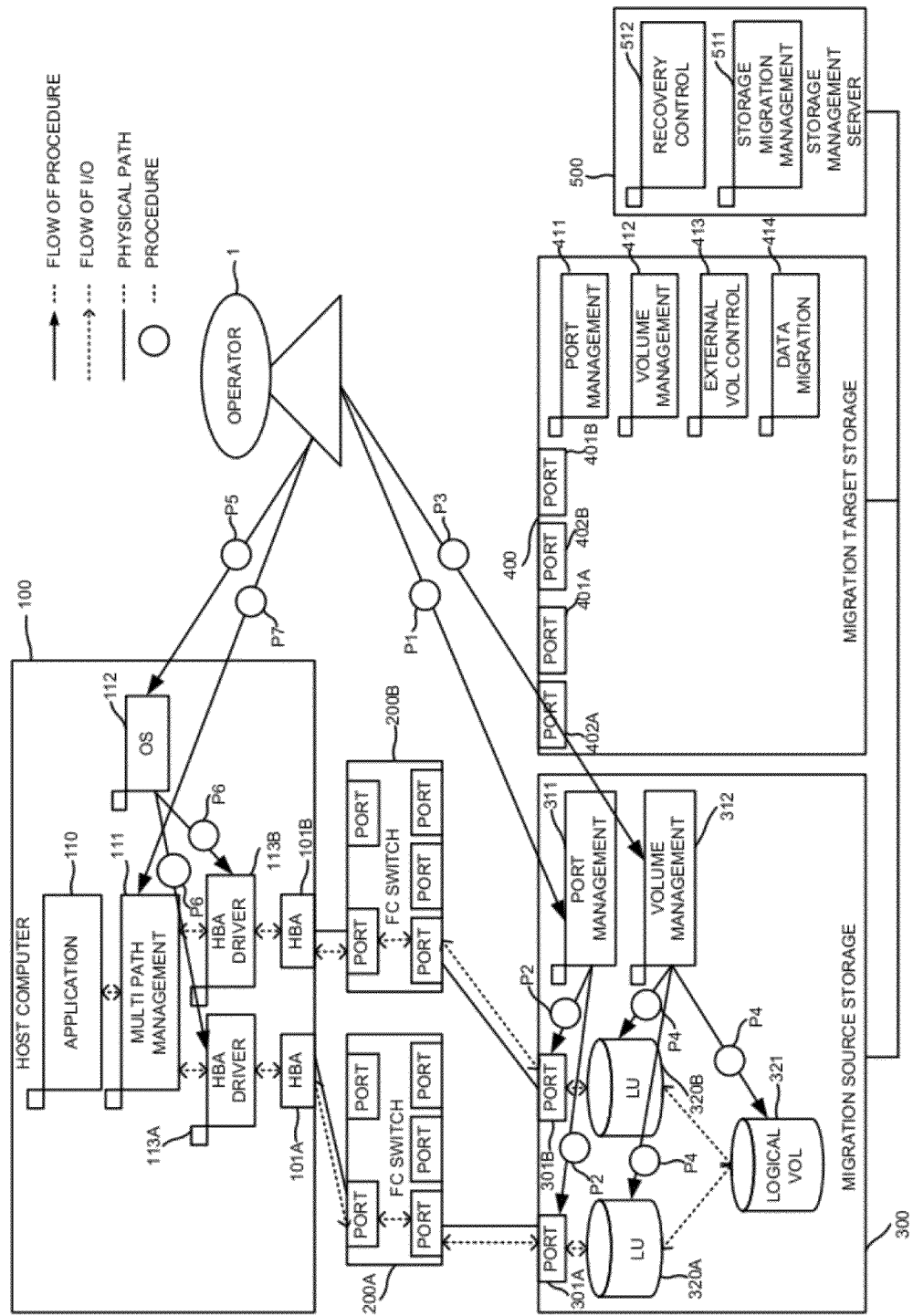
FIG. 9 illustrates an example of migration procedures according to an embodiment of the invention.

FIG. 9-16 illustrates the procedures of the migration. Specifically, FIG. 9 illustrates an example procedure of introducing the Migration Source Storage 300 to start the migration procedure.

Procedure P1: The Operator 1 sets the port configuration of Port 301a and 301b, for example the security and QoS setting, by using Port Management 311.

Procedure P2: The Port Management 311 configures the setting of Port 301a and 301b based on the port configuration.

Procedure P3: The Operator 1 makes new LU 320a and 320b sharing same Logical Volume 321 by using Volume Management 312.

Procedure P4: The Volume Management 312 provisions Logical Volume 321 and LU 320a and 320b with configured setting.

Procedure P5: The Operator 1 sets the configuration of HBA 101a and 101b to OS 112.

Procedure P6: The OS 112 runs the HBA Driver 113a and 113b for HBA 101a and 101b.

Procedure P7: The Operator 1 sets the Multi Path Management 111 to sets the device file and path.

Figure 10:
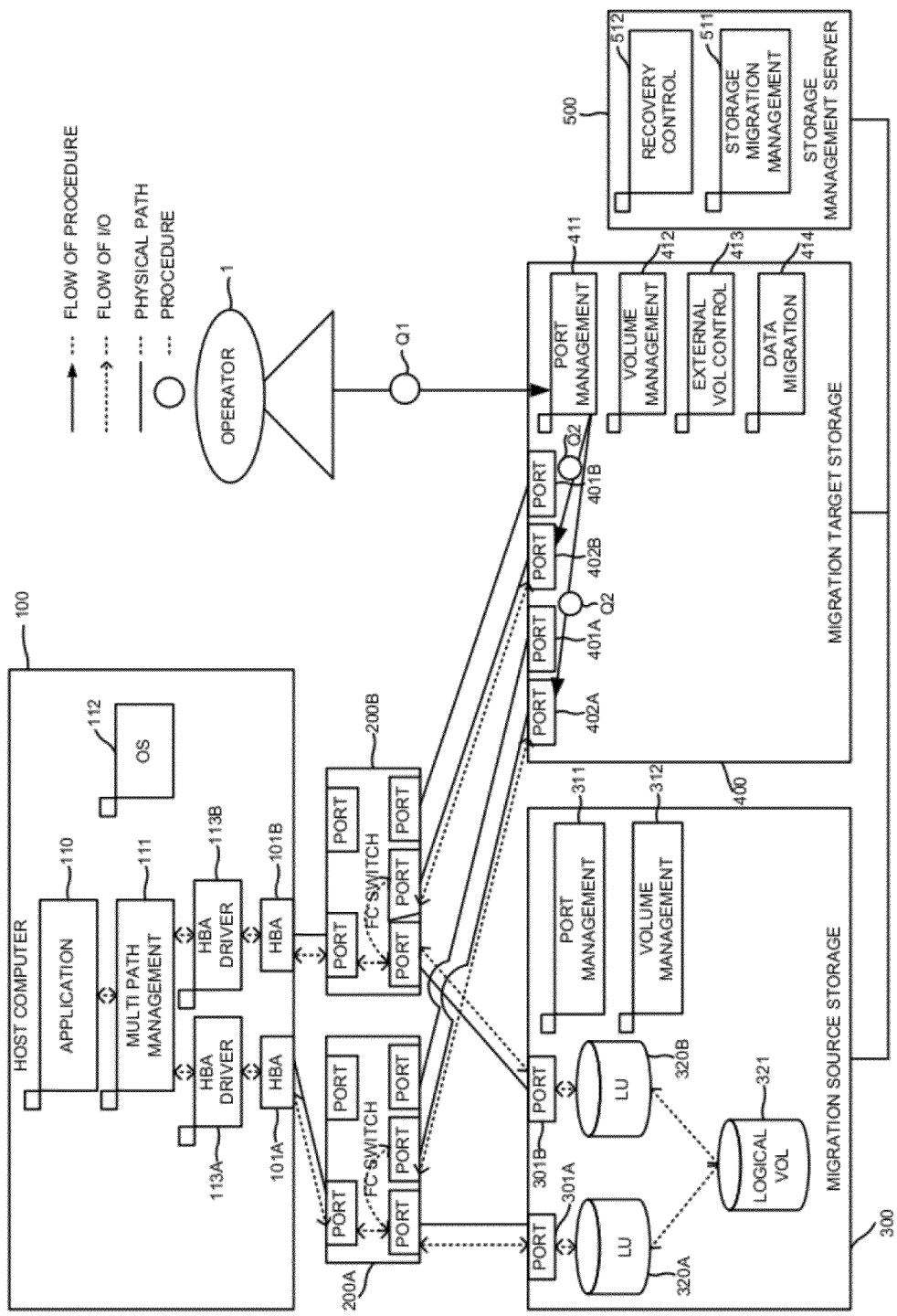
FIG. 10 illustrates an exemplary procedure for introducing the migration target storage according to an embodiment of the invention.

FIG. 10 illustrates an example procedure for introducing the Migration Target Storage 400.

Procedure Q1: The Operator 1 sets the port configuration of Port 402a and 402b by using Port Management 411.

Procedure Q2: The Port Management 411 configures the setting of Port 402a and 402b based on the port configuration, and finds LU 320a and 320b after logging-in.

Figure 11:
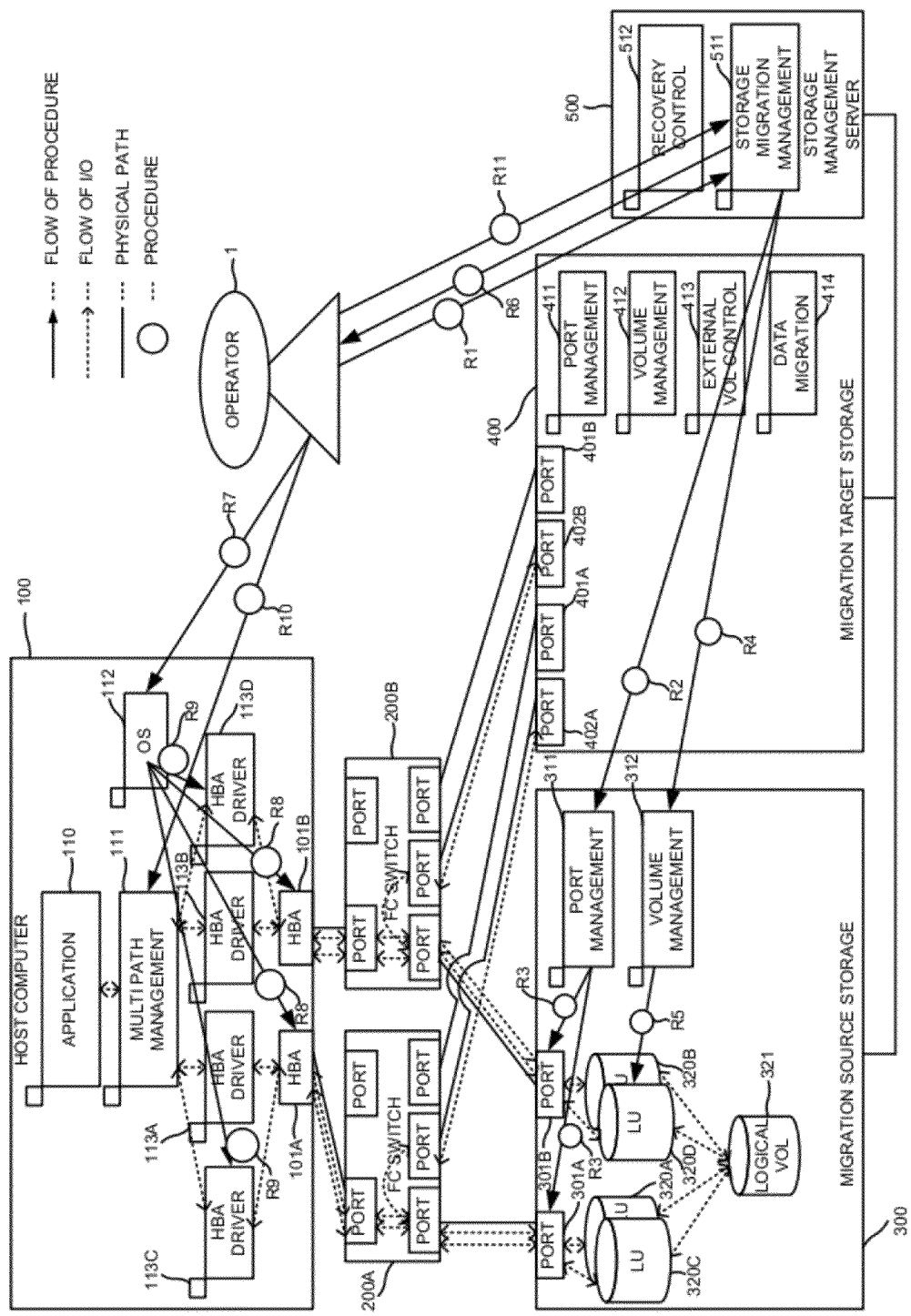
FIG. 11 illustrates exemplary procedures related to the flowchart of FIG. 7 according to an embodiment of the invention.

FIG. 11 further illustrates the procedure from Step 511-2 to Step 511-11.

Procedure R1: The Operator 1 starts the migration by issuing an order to Storage Migration Management 511.

Procedure R2: The Storage Migration Management 511 orders the Port Management 311 to set virtual target ports on Port 301*a* and 301*b*.

Procedure R3: The Port Management 311 sets virtual target ports on Port 301*a* and 301*b*.

Procedure R4: The Storage Migration Management 511 orders the Volume Management 312 to provision new LU 320*c* and 320*d* which relate to the same Logical Volume 321 that LU 320*a* and 320*b* have.

Procedure R5: The Volume Management 312 provisions new LU 320*c* and 320*d* and makes a relationship with Logical Volume 321 and virtual target ports on Ports 301*a* and 301*b*.

Procedure R6: The Storage Migration Management 511 tells the Operator 1 to change the configuration of Host Computer 100.

Procedure R7: The Operator 1 changes the HBA configuration on OS 112 to set new virtual initiator pots on HBA 101*a* and 101*b*.

Procedure R8: The OS 112 sets new virtual initiator ports on HBA 101*a* and 101*b*.

Procedure R9: The OS 112 starts HBA Driver 113*c* and 113*d* for the new virtual initiator ports on HBA 101*a* and 101*b*.

Procedure R10: The Operator 1 orders the Multi Path Management 111 to set the device file and path for the new virtual initiator ports on HBA 101*a* and 101*b*.

Procedure R11: The Operator 1 informs the Storage Migration Management 511 to end the host computer operation.

Figure 12:
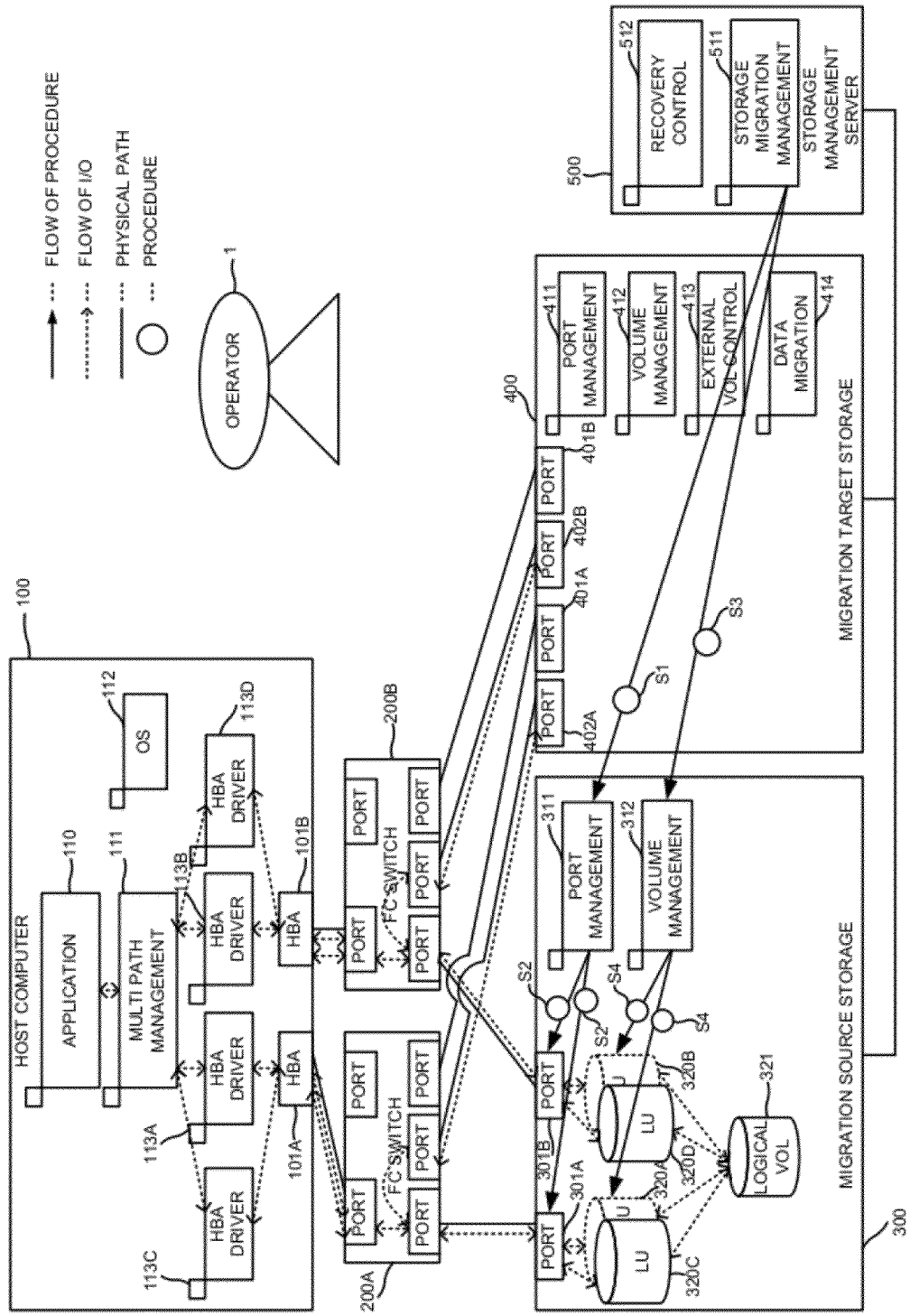
FIG. 12 illustrates additional example of procedures related the flowchart of FIG. 7 according to alternative embodiments of the invention.

FIG. 12 further illustrates the procedure related to Step 511-12.

Procedure S1: The Storage Migration Management 511 orders the Port Management 311 to stop the existing (not virtual) target ports on Port 301*a* and 301*b*.

Procedure S2: The Port Management 311 makes Port 301*a* and 301*b* log-out except for the virtual target ports.

Procedure S3: The Storage Migration Management 511 orders the Volume Management 312 to remove LU 320*a* and 320*b*.

Procedure S4: The Volume Management 312 deletes LU 320*a* and 320*b*.

Figure 13:
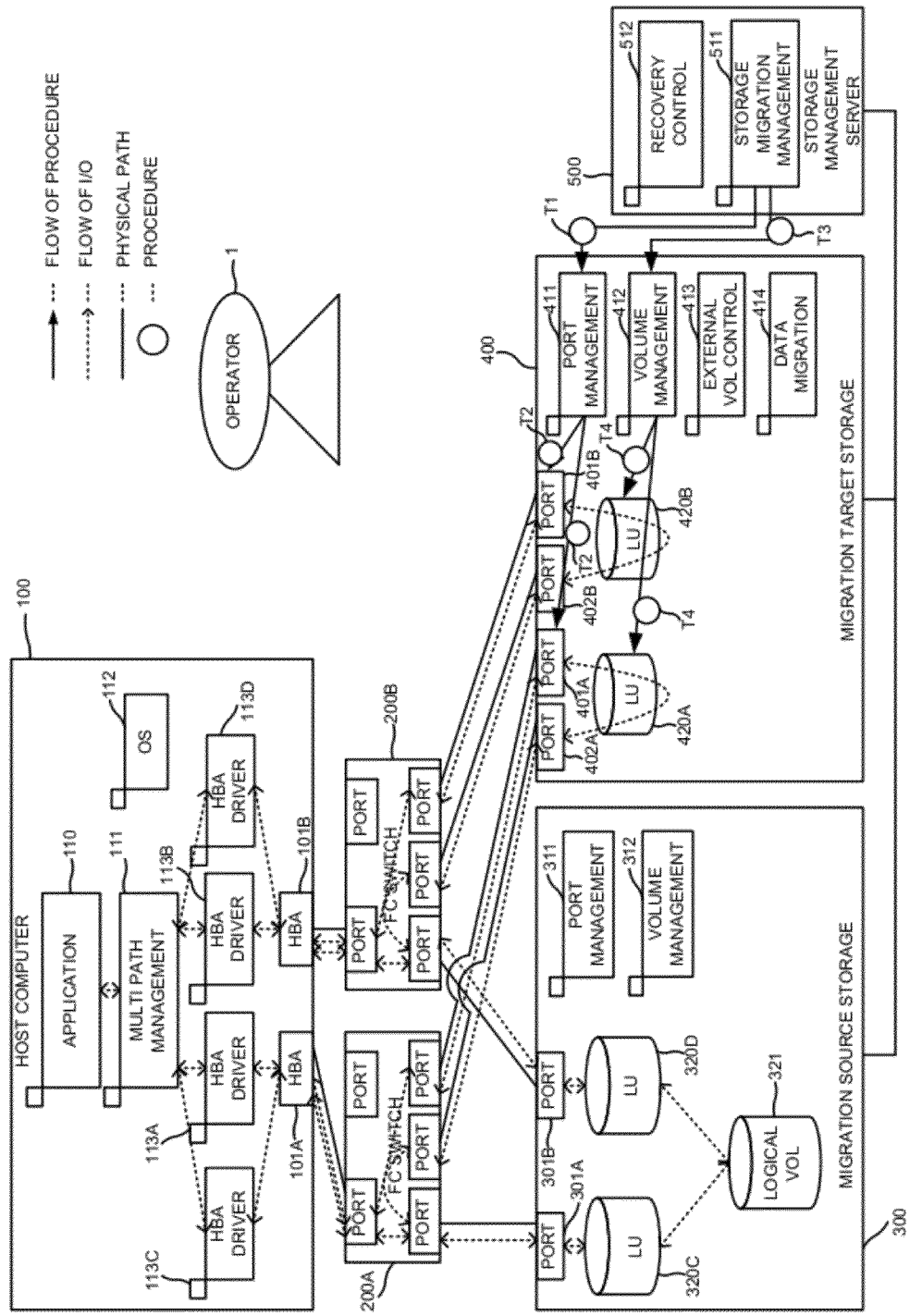
FIG. 13 illustrates additional exemplary procedures related to the flowchart of FIG. 7 according to embodiments of the invention.

FIG. 13 further illustrates the procedures related to Step 511-13 and Step 511-17.

Procedure T1: The Storage Migration Management 511 orders the Port Management 411 to set new virtual target ports on Port 401*a* and 401*b*. The new virtual target ports have the same name of the removed ports on Port 301*a* and Port 301*b*.

Procedure T2: The Port Management 411 sets the virtual target ports on Port 401*a* and 401*b*.

Procedure T3: The Storage Migration Management 511 orders the External Volume Control 413 to provision LU 420*a* and 420*b* with an external volume function to transfer I/O to LU 320*c* and 320*d*.

Procedure T4: External Volume Control 413 provisions LU 420*a* and 420*b* with external volume function to transfer I/O to LU 320*c* and 320*d*.

Figure 14:
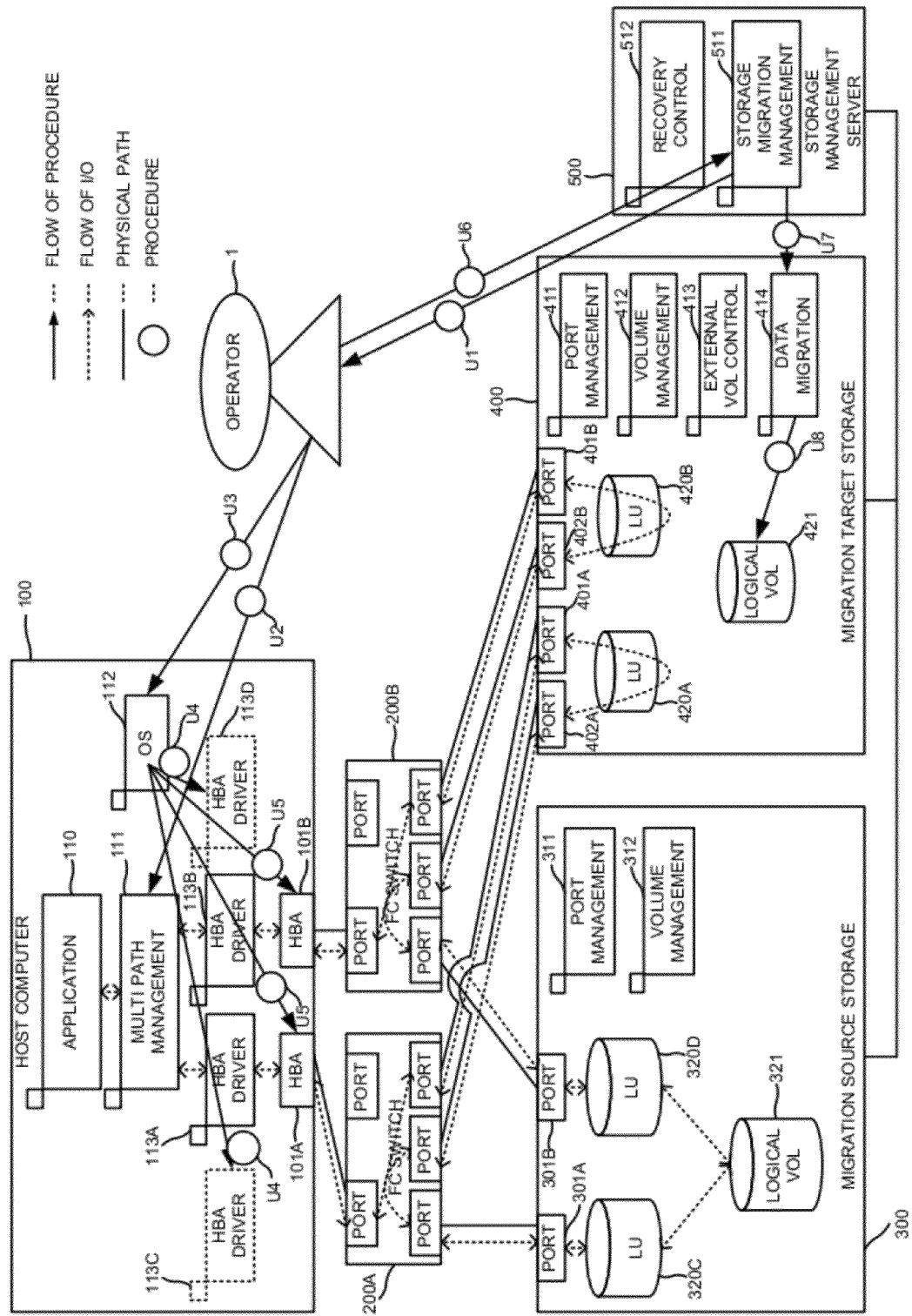
FIG. 14 illustrates additional exemplary procedures related to the flowchart of FIG. 7 according to embodiments of the invention.

FIG. 14 further illustrates the procedures related to Steps 511-18 to 511-22, and Step 414-2-2.

Procedure U1: The Storage Migration Management 511 tells the Operator 1 to change the configuration of Host Computer 100.

Procedure U2: The Operator 1 deletes the paths between the virtual initiator ports on HBA 101*a*/101*b* and the virtual target ports on Port 301*a*/301*b* from the Multi Path Management 111.

Procedure U3: The Operator 1 deletes the virtual initiator ports on HBA 101*a* and 101*b* by using OS 112.

Procedure U4: The OS 112 stops HBA Driver 113*c* and 113*d*.

Procedure U5: The OS 112 deletes virtual initiator ports on HBA 101*a* and 101*b*.

Procedure U6: The Operator 1 informs the Storage Migration Management 511 of the completion of changing the configuration for Host Computer 100.

Procedure U7: The Storage Migration Management 511 orders the Data Migration 414 to start the migration process.

Procedure U8: The Data Migration 414 copies data from Logical Volume 321 to Logical Volume 421.

Figure 15:
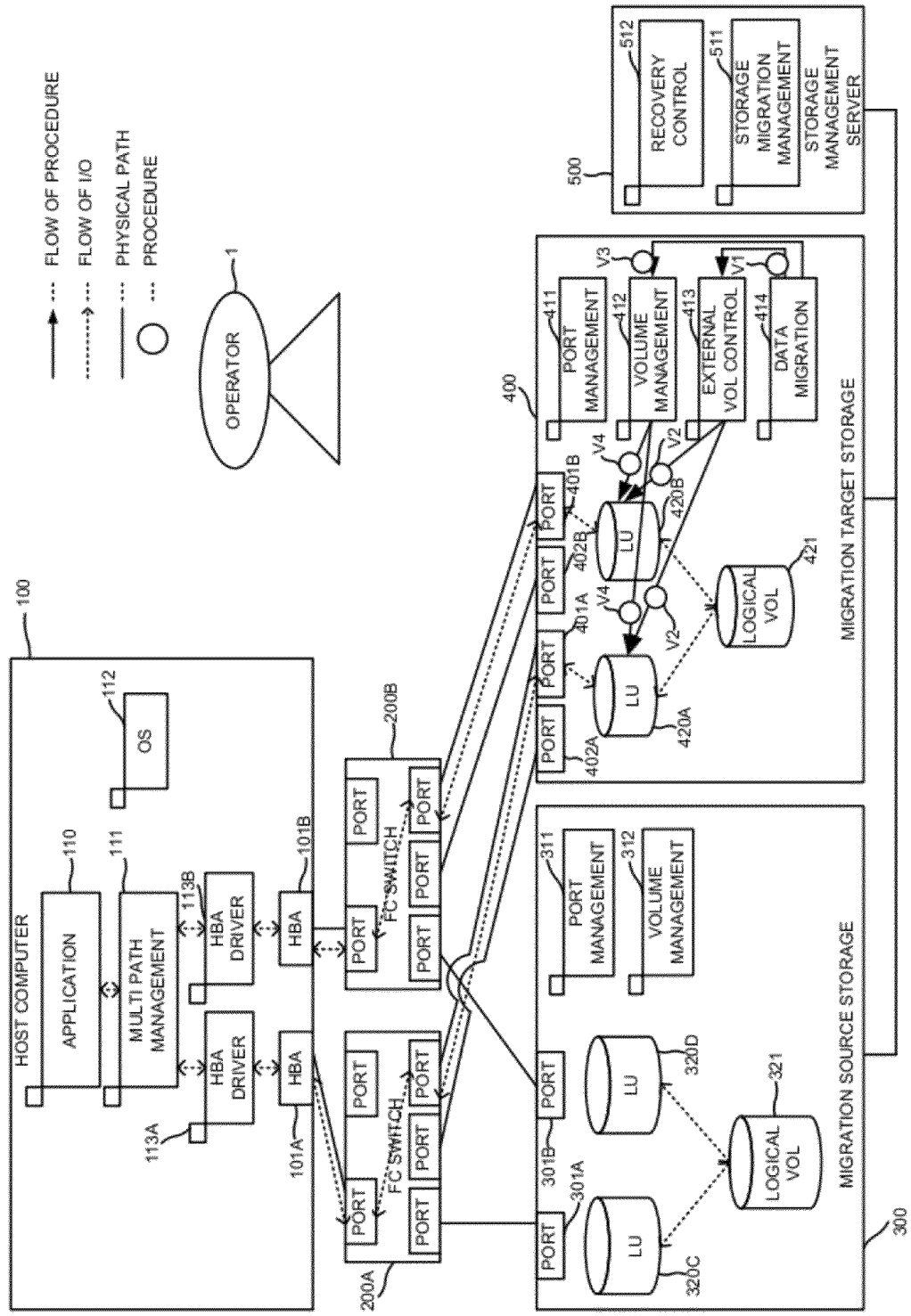
FIG. 15 illustrates additional exemplary procedures related to the flowchart of FIG. 7 according to embodiments of the invention.

FIG. 15 further illustrates the procedure related to Step 414-2-3.

Procedure V1: The Data Migration 414 orders the External Volume Control 413 to suspend LU 420*a* and 420*b*.

Procedure V2: The External Volume Control 413 suspends LU 420*a* and 420*b*.

Procedure V3: The Data Migration 414 orders the Volume Management 412 to change the configuration of LU 420*a* and 420*b* to share Logical Volume 421, and restart LU 420*a* and 420*b*.

Procedure V4: The Volume Management 412 sets LU 420*a* and 420*b* to share Logical Volume 421 and restarts the LUs.

Figure 16:
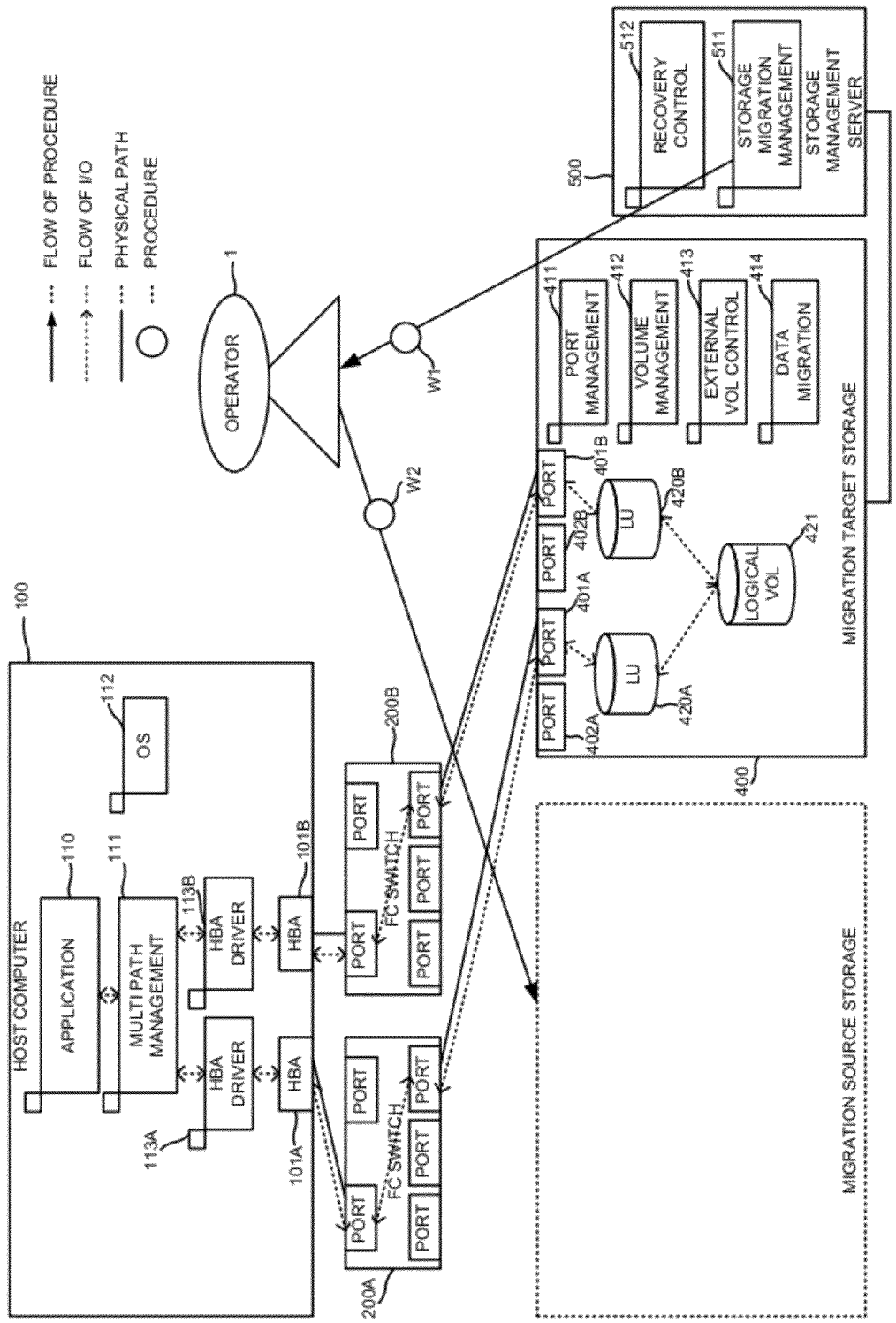
FIG. 16 illustrates additional exemplary procedures related to the flowchart of FIG. 7 according to embodiments of the invention.

FIG. 16 further illustrates procedures conducted after Step 511-23.

Procedure W1: The Storage Migration Management 511 informs the Operator 1 of the completion of the migration.

Procedure W2: Operator 1 removes Migration Source Storage Subsystem 400.

Figure 17:
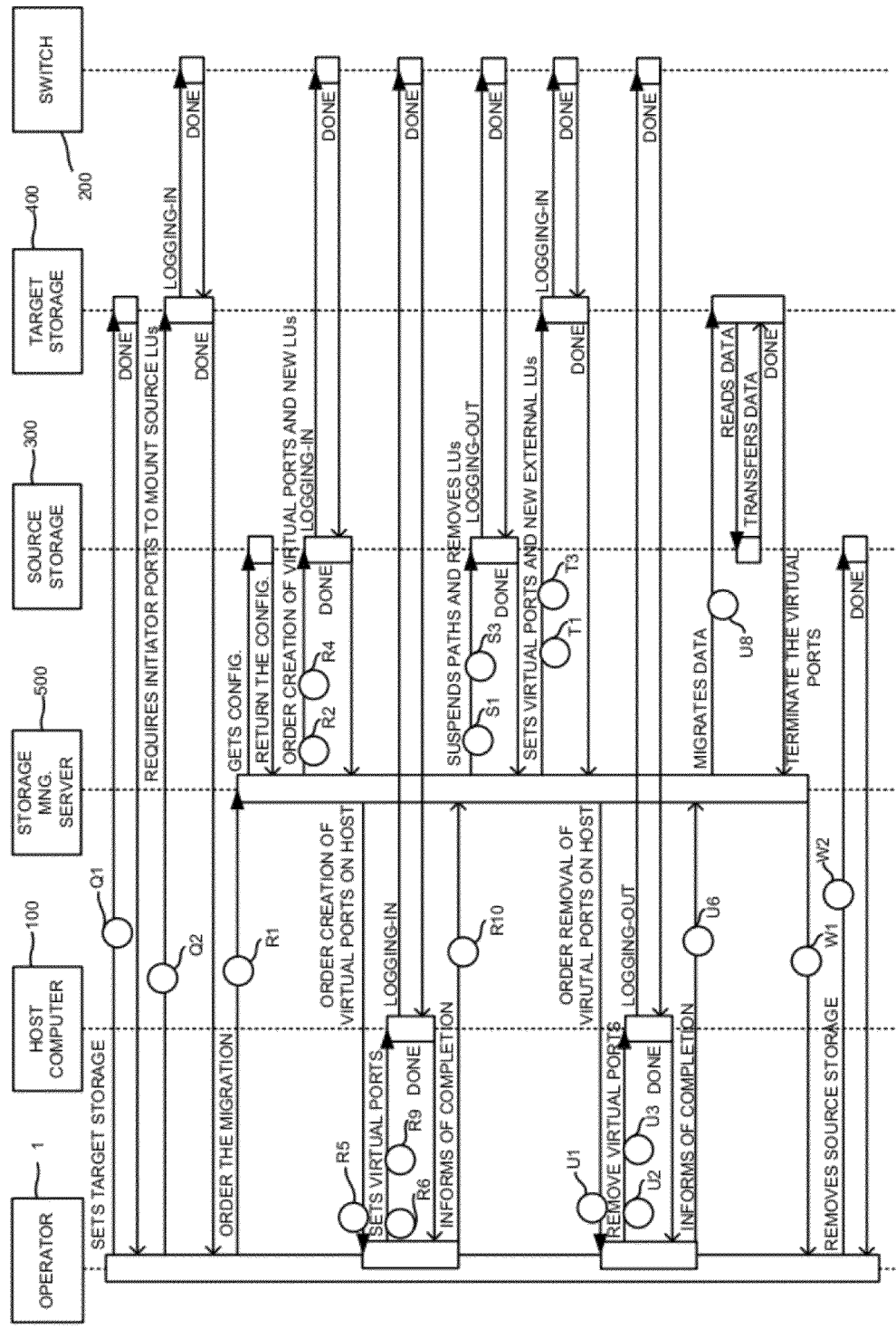
FIG. 17 further illustrates an exemplary sequence based on FIGS. 9 to 16, according to embodiments of the invention.

FIG. 17 further illustrates the sequence of the migration in relation to FIGS. 9 to 16. In particular, FIG. 17 illustrates an exemplary sequence of the migration with respect to the Host Computer 100, Storage Management Server, Source Storage 300, Target Storage 400, and Switch 200, and the interaction of each of those units during the migration.

Figure 18:
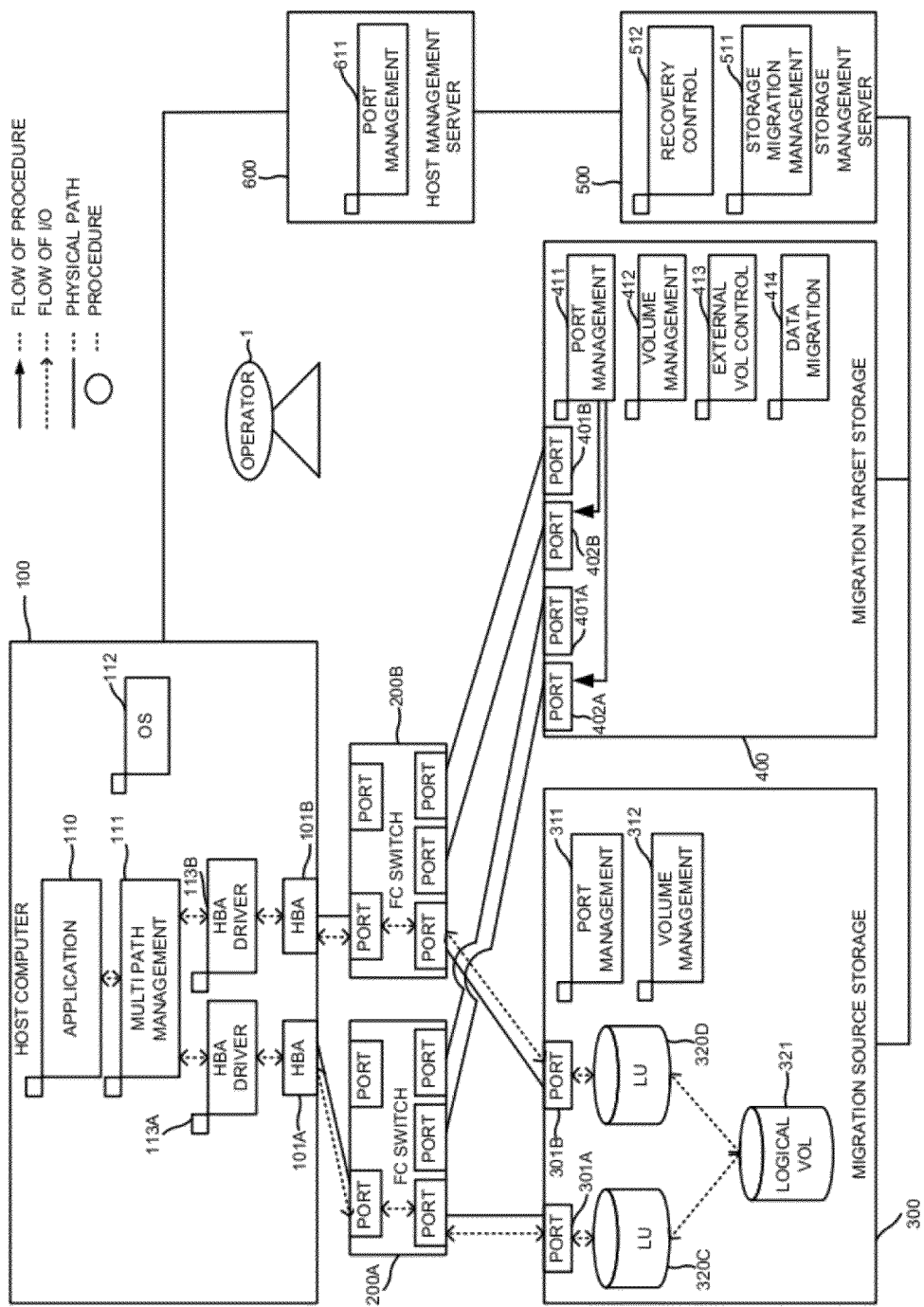
FIG. 18 illustrates another possible physical and logical configuration of a system according to embodiments of the invention.

FIG. 18 illustrates another possible physical and logical configuration of the system according to embodiments of the invention. In this configuration, a Host Management Server 600 is utilized. The Host Management Server 600 is connected to the Host Computer 100 and the Storage Management Server 500. Host Management Server 600 has Port Management 611. The Port Management 611 can manage the server port setting by communicating to the OS 112 and the Multi Path Management 111. The Port Management 600 can receive the necessary requirements from the Storage Migration Management 511 and return the result.

Second Embodiment

Figure 19:
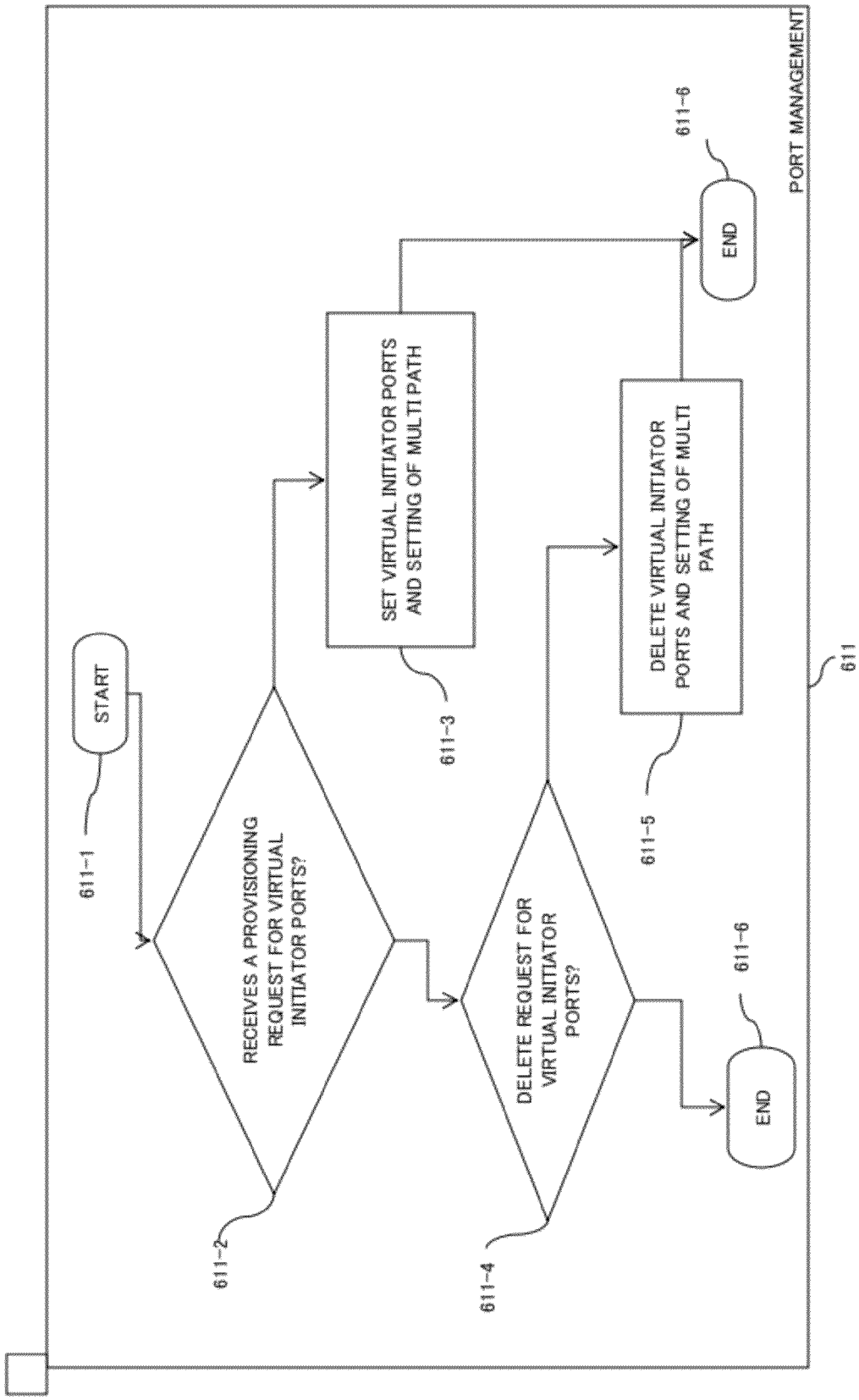
FIG. 19 illustrates another exemplary table and flowchart of aspects of the system according to embodiments of the invention.

FIG. 19 illustrates an example flowchart for the Port Management 611.

Step 611-2 and Step 611-3: The Host Management Server 611 checks the received request. If it is a provisioning request, the process proceeds to Step 611-3. If it is a delete request, the process proceeds to Step 611-4.

Step 611-3: The Host Management Server 611 orders the OS 112 to make virtual initiator ports on HBA 101*a* and 101*b*, and run HBA Driver 101*c* and 101*d*. Also, the Host Management Server 611 may order the Multi Path Management 111 to set new paths for the virtual initiator ports.

Step 611-4: The Host Management Server 611 orders the Multi Path Management 111 to delete paths of the virtual initiator ports. The Host Management Server 611 may further order the OS 112 to stop HBA Driver 101*c* and 101*d*, and delete virtual initiator ports from HBA 101*a* and 101*b*.

Figure 20:
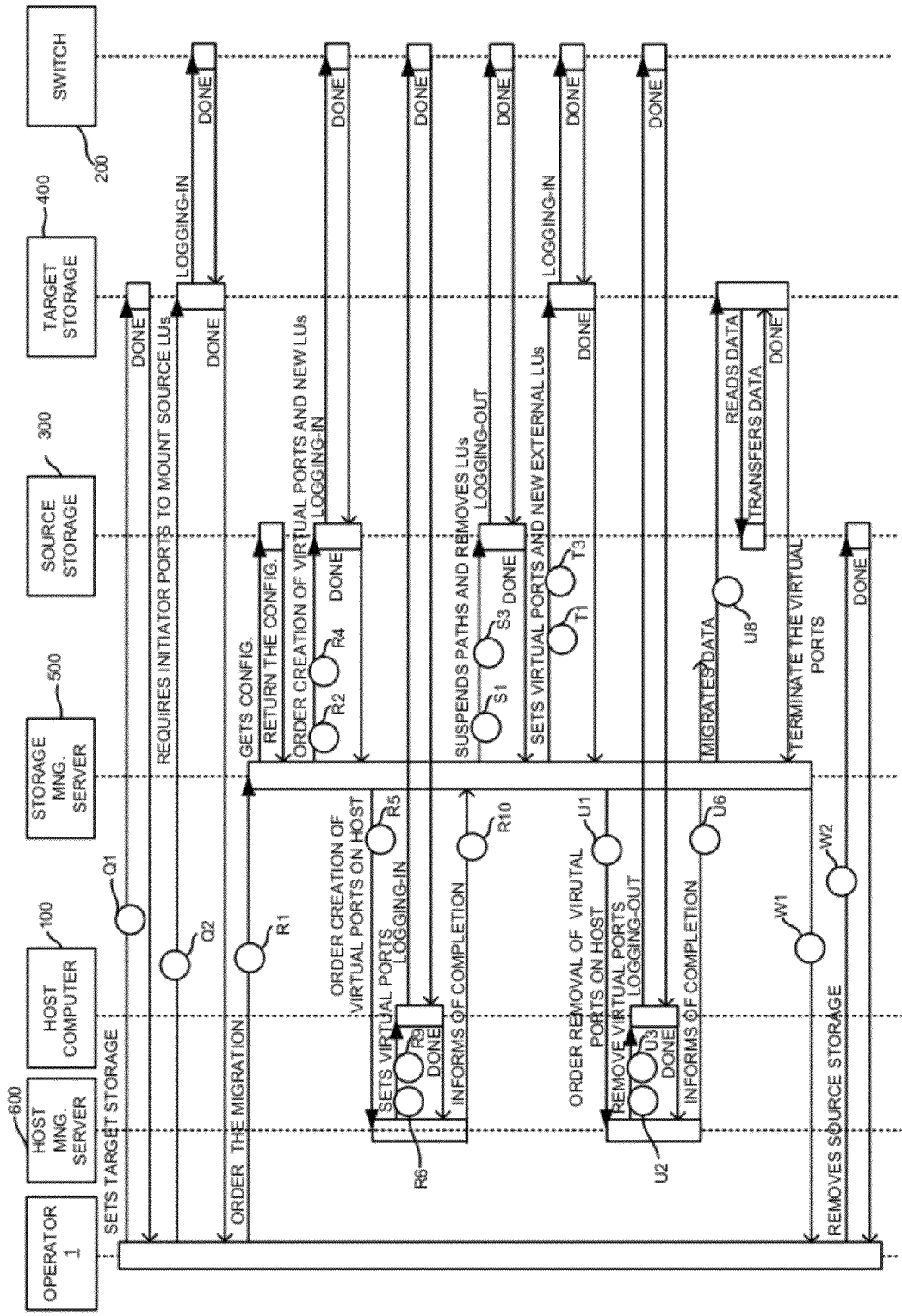
FIG. 20 illustrates additional example migration procedures according to embodiments of the invention.

FIG. 20 illustrates the migration sequence for an environment utilizing the Host Management Server 600. The configuration operation for Host Computer 100 is relocated to the Host Management Server 600 from Operator 1.

Third Embodiment

In the first embodiment, a new path is established between the Migration Source Storage 300 and Host Computer 100, in the third embodiment, at least two new paths are established between the Migration Target Storage System 400 and Host Computer 100 before terminating a path between the source storage system and the host. Although the new paths are established between the Host Computer and the Migration Target Storage System, redundancy can still be obtained between the Host and the Migration Source Storage System. This can be achieved, for example, by creating temporal LUs in the Migration Source Storage System, mounting the temporal LUs to the Migration Target Storage System, and then establishing paths to the mounted LUs of the Migration Target Storage System. Should one of the new paths fail, one of the remaining new paths maintains the redundancy between the Host and the Migration Target Storage System, and thereby to the Migration Source Storage System via the mounted LUs. The mounted LUs can be removed after migration is completed. An exemplary illustration of this process along with the differences between the first and third embodiments are shown in FIGS. 21 to 24.

Figure 21:
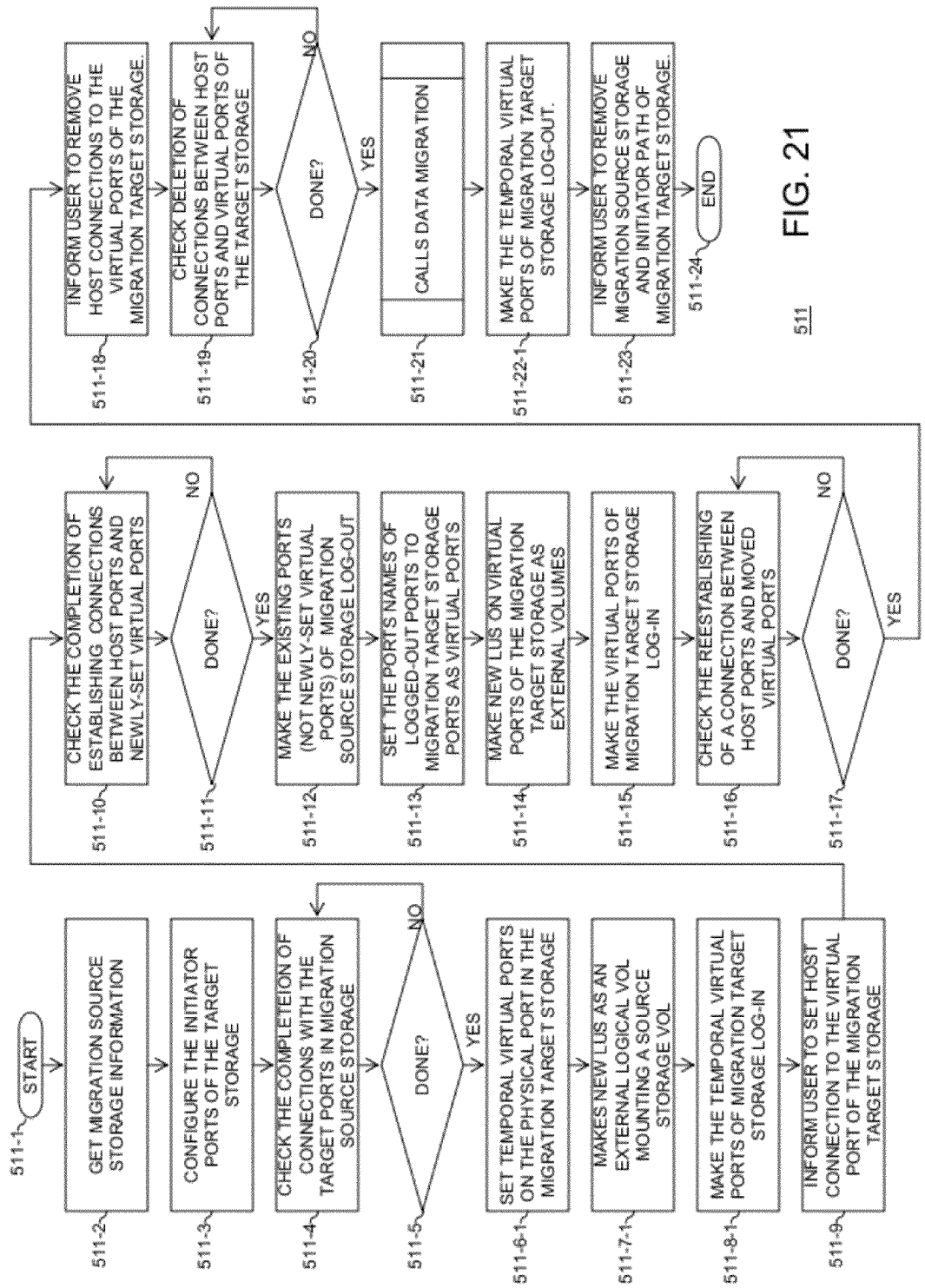
FIG. 21 illustrates an exemplary flowchart for Storage Migration Management 511.

FIG. 21 illustrates an exemplary alternative flowchart for Storage Migration Management 511.

Step 511-2: The Storage Management Server 500 gathers the configuration information from the Migration Source Storage Subsystem 300.

Step 511-3: The Storage Management Server 500 sends the path information to Port Management 411 to establish a path from Ports 402a and 402b to Ports 301a and 301b.

Step 511-4 and Step 511-5: The Storage Management Server 500 waits for the establishment of the path. If the path isn't established, notify user to check the condition of the cables or the security setting.

Step 511-6-1: The Storage Management Server 500 orders the Port Management 411 to set new virtual target ports on Port 401a and 401b.

Step 511-7-1: The Storage Management Server 500 orders the Volume Management 412 to provision new LUs 420c and 420d, using the new virtual target ports on Ports 401a and 401b, and to mount the Logical Volume 321 of LU 320a and 320b via the initiator ports 402a and 402b.

Step 511-8-1: The Storage Management Server 500 orders the new virtual target ports on Port 401a and 401b to log in the fabric.

Step 511-9-1: The Storage Management Server 500 informs the Operator 1 to make new connections from the Host Computer 100 to the new virtual (temporal) target ports on Port 401a and 401b.

Step 511-10 and Step 511-11: The Storage Management Server 500 waits for the completion of the path establishing from Ports 101a and 101b to the new virtual (temporal) target ports on 401a and 401b. During these steps, Operator 1 sets new virtual initiator ports on Port 101a and 101b, runs HBA Drivers 113c and 113d for the new virtual initiator ports, and registers the virtual initiator port to Multi Path Management 111.

Step 511-12: The Storage Management Server 500 orders the Port Management 311 to log out the target ports on Port 301a and 301b. Additionally, the Storage Management Server 500 may order the Port Management 311 to delete the name of the target ports on Port 301a and 301b.

Step 511-13: The Storage Management Server 500 orders the Port Management 411 to name the deleted name as virtual target ports to Port 401a and 401b.

Step 511-14: The Storage Management Server 500 orders the Extended Volume Control 413 to make new LUs as external volumes mounting LU 320c and 320d.

Step 511-15: The Storage Management Server 500 orders the Port Management 411 to log in the virtual target ports on Port 401a and 401b.

Step 511-16 and Step 511-17: The Storage Management Server 500 waits for the establishment of the path. During Step 511-12 and Step 511-14, the path between Ports 101a/101b and 301a/301b is active because of the path between the respective virtual ports.

Step 511-18: The Storage Management Server 500 informs the Operator 1 to terminate the virtual initiator ports on Port 101a and 101b.

Step 511-19 and Step 511-20: The Storage Management Server 500 waits for the completion of the logging-out of the virtual initiator ports on Port 101a and 101b.

Step 511-21: The Storage Management Server 500 orders the Data Migration 414 to migrate data and configuration from Logical Volume 321 to 421.

Step 511-22-1: After the migration is finished, the Migration Target Storage Subsystem 400 deletes the virtual (temporal) target ports on Port 401a and 401b.

Step 511-23: The Storage Management Server 500 informs the user to remove Migration Source Storage Subsystem 300.

Figure 22:
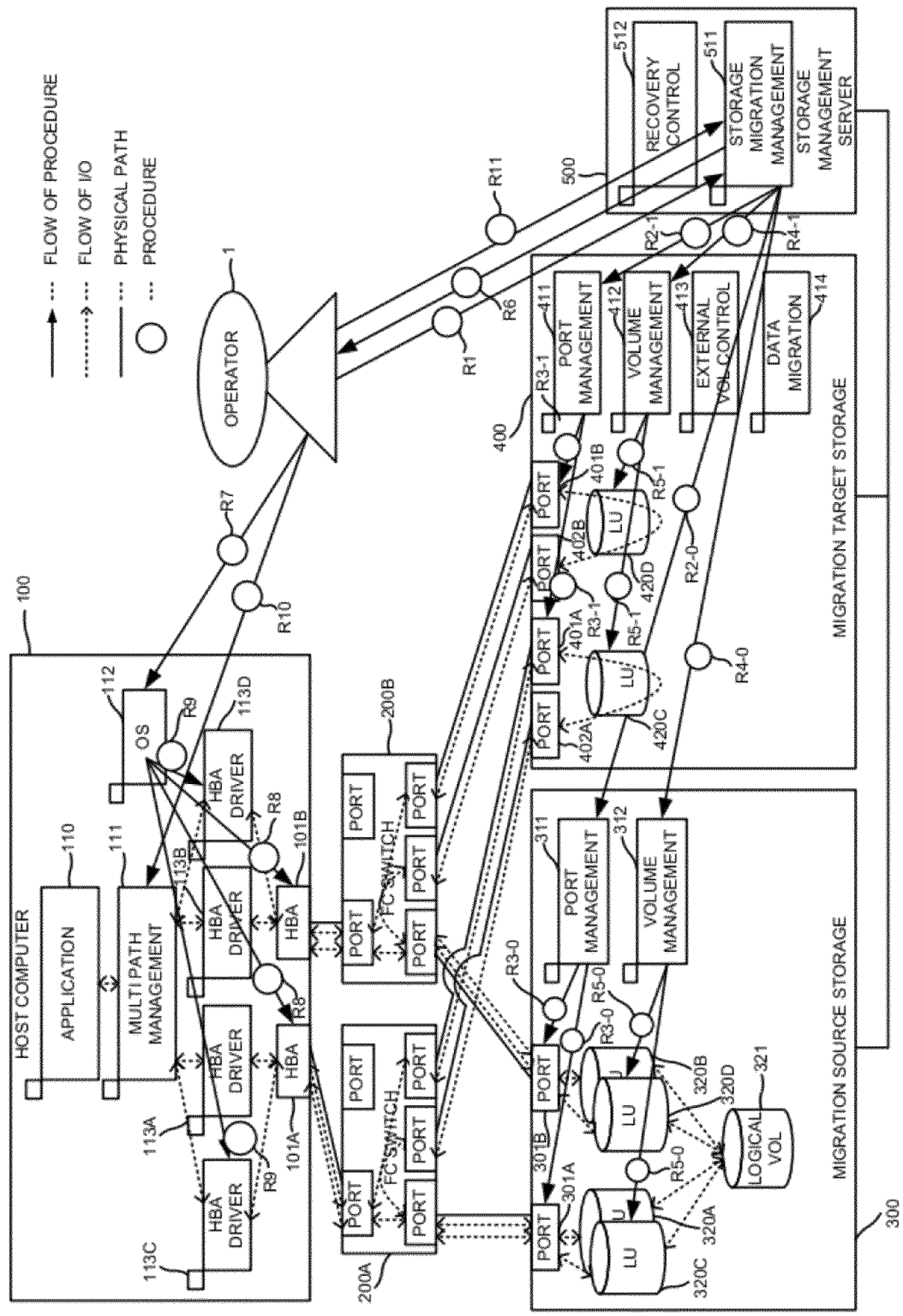
FIG. 22 further illustrates an exemplary procedure during Step 511-2 to Step 511-11 according to an embodiment of the invention.

FIG. 22 further illustrates the procedure during Step 511-2 to Step 511-11.

Procedure R1: The Operator 1 starts the migration by issuing an order to Storage Migration Management 511.

Procedure R2-0: The Storage Migration Management 511 orders the Port Management 311 to set virtual target ports on Port 301a and 301b.

Procedure R2-1: The Storage Migration Management 511 orders the Port Management 411 to set virtual target ports on Port 401a and 401b.

Procedure R3-0: The Port Management 311 sets virtual target ports on Port 301a and 301b.

Procedure R3-1: The Port Management 411 sets virtual target ports on Port 401a and 401b.

Procedure R4-0: The Storage Migration Management 511 orders the Volume Management 312 to provision new LU 320c and 320d which relate to the same Logical Volume 321 that LU 320a and 320b have.

Procedure R4-1: The Storage Migration Management 511 orders the Volume Management 412 to provision new LU 420c and 420d which mounts the LU 320c and 320d via the Ports 402a and 402b.

Procedure R5-0: The Volume Management 312 provisions new LU 320c and 320d and makes a relationship with Logical Volume 321 and virtual target ports on Ports 301a and 301b.

Procedure R5-1: The Volume Management 412 provisions new LU 420c and 420d mounting LU 320a and 320b via the Ports 402a and 402b.

Procedure R6: The Storage Migration Management 511 tells the Operator 1 to change the configuration of Host Computer 100.

Procedure R7: The Operator 1 changes the HBA configuration on OS 112 to set new virtual initiator pots on HBA 101a and 101b.

Procedure R8: The OS 112 sets new virtual initiator ports on HBA 101a and 101b.

Procedure R9: The OS 112 starts HBA Driver 113c and 113d for the new virtual initiator ports on HBA 101a and 101b.

Procedure R10: The Operator 1 orders the Multi Path Management 111 to set the device file and path for the new virtual initiator ports on HBA 101a and 101b.

Procedure R11: The Operator 1 informs the Storage Migration Management 511 to end the host computer operation.

Figure 23:
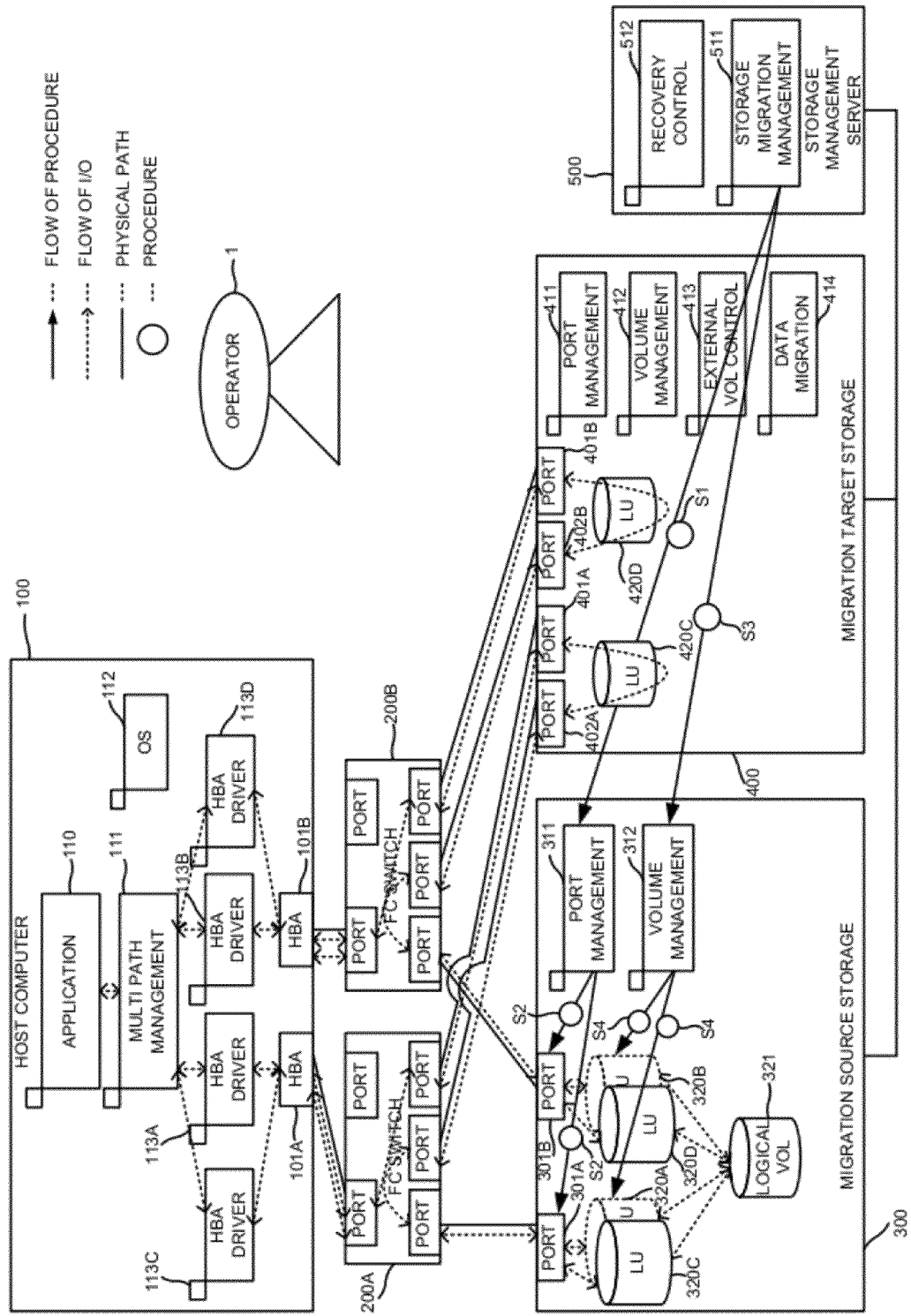
FIG. 23 further illustrates an exemplary procedure related to Step 511-13 and Step 511-17 according to an embodiment of the invention.

FIG. 23 further illustrates the procedure related to Step 511-12.

Procedure S1: The Storage Migration Management 511 orders the Port Management 411 to stop the target ports on Port 301a and 301b.

Procedure S2: The Port Management 311 makes Port 301a and 301b log-out except for the virtual target ports.

Procedure S3: The Storage Migration Management 511 orders the Volume Management 312 to remove LU 320a and 320b.

Procedure S4: The Volume Management 312 deletes LU 320a and 320b.

Figure 24:
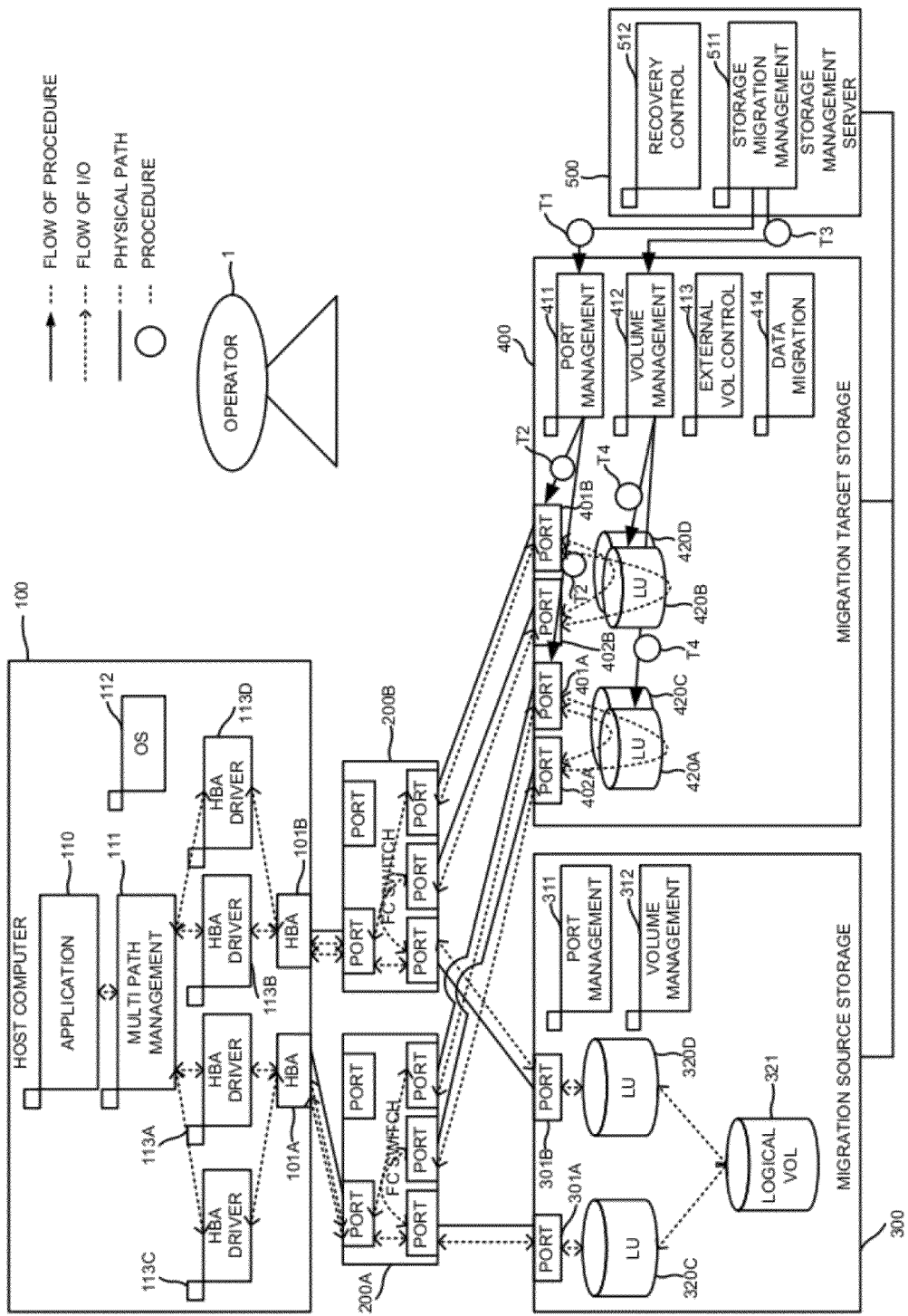
FIG. 24 further illustrates an exemplary procedure related to Step 511-13 and Step 511-17 according to an embodiment of the invention.

FIG. 24 further illustrates the procedures related to Step 511-13 and Step 511-17.

Procedure T1: The Storage Migration Management 511 orders the Port Management 411 to set new virtual target ports on Port 401a and 401b. The new virtual target ports have the same name of the removed ports on Port 301a and Port 301b.

Procedure T2: The Port Management 411 sets the virtual target ports on Port 401a and 401b.

Procedure T3: The Storage Migration Management 511 orders the External Volume Control 413 to provision LU 420a and 420b with an external volume function to transfer I/O to LU 320c and 320d.

Procedure T4: External Volume Control 413 provisions LU 420a and 420b with external volume function to transfer I/O to LU 320c and 320d.

Moreover, other implementations of the invention will be apparent to those skilled in the art from consideration of the specification and practice of the invention disclosed herein. Various aspects and/or components of the described embodiments may be used singly or in any combination in the computerized storage system preventing a single point of failure. It is intended that the specification and examples be considered as exemplary only, with a true scope and spirit of the invention being indicated by the following claims.

What is claimed is:

1. A system, comprising:
a host including a plurality of physical ports; a source storage system; a target storage system; a first switch; and a host management server controlling I/O between the target storage system and the source storage system;
wherein the host accesses the source storage system via a source logical path through the first switch;
wherein in response to a migration request to migrate data from the source storage system to the target storage system:
(a) a first logical path is added between the host and the target storage system via the first switch,
(b) a second logical path is added between the host and the target storage system via the first switch, and
(c) the first logical path is terminated after completion of the (b);
wherein the source logical path between the host and the source storage system is terminated after completion of establishing connections for the first logical path and the second logical path; and wherein a second virtual port is created in the target storage system for the second logical path using a port name previously used for a first virtual port in the source storage system for the source logical path; wherein a logical volume is shared between the first virtual port and a port of the target storage system receiving access from the host via the first switch;
wherein a notification is sent when the first logical path and the second logical path are added; and wherein the notification is sent to the host management server and the migration of data from the source storage system to the target storage system is performed after the notification is received by the host management server.

2. The system of claim 1, wherein the migration of data is conducted from the source storage system to the target storage system after a log in;
wherein if suspension of the second logical path occurs, the host accesses the source storage system using the first logical path.

3. The system of claim 1, wherein in response to the migration request, a logical volume is created in the target storage system, wherein the logical volume of the target storage volume is controlled as an external volume of the source storage system; wherein at least two paths are maintained between the host and the target storage system during the migration.

4. A system, comprising: a host including a plurality of physical ports; a first switch; a source storage system; a target storage system; and a host management server controlling I/O between the target storage system and the source storage system;
wherein said host accesses the source storage system via a source logical path through the first switch;
wherein in response to a migration request to migrate data from the source storage system to the target storage system:
(a) a first logical path is added between the host and the source storage system via the first switch,
(b) a second logical path is added between the host and the target storage system via the first switch, and
(c) the first logical path is terminated after completion of the (b);
wherein the source logical path is terminated upon completion of establishing the first logical path and the second logical path, wherein a second virtual port is created in the target storage system for the second logical path using a port name previously used for a first virtual port in the source storage system for the source logical path; wherein the second virtual port in the target storage system for establishing the second logical path between said host and said target storage system is created after the first virtual port in the source storage system is created; wherein the host logs into the first switch to add the first logical path;
wherein a logical volume is shared between the first virtual port created in the source storage system and a port of the source storage system receiving said accesses from the host via said first switch; and wherein a notification is sent when the first logical path is added, wherein said notification is sent to the host management server and said migration of data is performed after said notification is received by the host management server.

5. A method of migrating data from a source storage system to a target storage system, the method comprising: receiving a migration request from a server to migrate data from said source storage system to
said target storage system; in response to the migration request:
a) adding a first logical path between a host and the target storage system via a switch,
b) adding a second logical path between a host and the target storage system via the switch, and c) terminating the first logical path after the b; and migrating the data from the source storage system to the target storage system, logging into a first switch provided between the server and the target storage system, wherein a logical volume is shared between the second virtual port created in the target storage system and a port of the target storage system receiving access from the host via said first switch; and sending a notification to a host management server when the first logical path and the second logical path are added, wherein the migration is performed after the notification is received by the host management server; and wherein a second virtual port is created in the target storage system for the second logical path using a port name previously used for a first virtual port in the source storage system for a source logical path connecting the host to the source storage system via the switch.

6. The method of claim 5, wherein the source logical path is terminated upon completion of the migration.

7. The method of claim 5, wherein at least two paths are maintained between the target storage system and the host during the migration.

8. The method of claim 5, wherein the migrating is conducted between the source storage system and the target storage system after a log in.

* * * * *